United States Patent [19]

Bouchard et al.

[11] Patent Number: 4,596,037

[45] Date of Patent: Jun. 17, 1986

[54] VIDEO MEASURING SYSTEM FOR DEFINING LOCATION ORTHOGONALLY

[75] Inventors: Donald R. Bouchard; John L. Danton; Kevin A. Dawson, all of Endicott; David J. Sloma, Johnson City, all of N.Y.

[73] Assignee: International Business Machines Corporation, Armonk, N.Y.

[21] Appl. No.: 588,012

[22] Filed: Mar. 9, 1984

[51] Int. Cl.⁴ .............................................. G06K 9/00
[52] U.S. Cl. ....................................... 382/8; 356/384; 356/387; 358/101; 358/107; 382/62
[58] Field of Search ............... 382/8, 62, 54; 358/101, 358/106, 107, 93; 356/383, 384, 387, 380

[56] References Cited

U.S. PATENT DOCUMENTS

| | | | |
|---|---|---|---|
| 3,055,263 | 9/1962 | Kuehne | 356/396 |
| 3,094,623 | 6/1963 | Weiss | 356/398 |
| 3,146,350 | 8/1964 | Topfer | 356/380 |
| 3,295,105 | 12/1966 | Gray et al. | 382/54 |
| 3,540,831 | 11/1970 | Lovering | 356/375 |
| 3,546,671 | 12/1970 | Rogert et al. | 382/61 |
| 3,744,905 | 7/1973 | Smith | 356/378 |
| 3,746,455 | 7/1973 | Flamholz | 356/378 |
| 3,930,150 | 12/1975 | Marantette | 356/391 |
| 3,988,535 | 10/1976 | Hickman et al. | 358/101 |
| 4,163,213 | 7/1979 | Nadler | 382/62 |
| 4,172,553 | 8/1979 | Feather et al. | 356/375 |
| 4,269,515 | 5/1981 | Altman | 356/387 |
| 4,300,836 | 11/1981 | Holmes et al. | 356/376 |
| 4,305,096 | 12/1981 | Yokoshima et al. | 358/106 |
| 4,343,553 | 8/1982 | Nakagawa et al. | 358/101 |

FOREIGN PATENT DOCUMENTS

| | | | |
|---|---|---|---|
| 0066321 | 8/1982 | European Pat. Off. | |
| 2536380 | 7/1976 | Fed. Rep. of Germany . | |
| 45-4207 | 2/1970 | Japan | 356/380 |
| 53-116865 | 10/1978 | Japan | 356/380 |
| 1377656 | 12/1974 | United Kingdom . | |
| 1404311 | 8/1975 | United Kingdom | 356/380 |
| 827974 | 1/1981 | U.S.S.R. | 356/380 |

Primary Examiner—Leo H. Boudreau
Assistant Examiner—Joseph Mancuso
Attorney, Agent, or Firm—David L. Adour; Kenneth P. Johnson

[57] ABSTRACT

Apparatus for determining the location of a physical feature, such as a hole in a panel, relative to two coordinate axes by optically scanning across the panel and hole from a reference while measuring the distance of the hole from the reference and the length of the hole chord for each of a plurality of scans, then adding half the chord length to the respective distance to the hole edge and averaging the results for the plurality of scans. Scan lines used for the hole edge and chord measurement can be selected from among a plurality of scan lines having a predetermined chord length. The measuring apparatus can also be readily adjusted to accommodate a range of feature dimensions.

6 Claims, 13 Drawing Figures

B) VIDEO SIGNAL

C) COUNTER ENABLE

VIDEO MEASURING SYSTEM FOR DEFINING LOCATION ORTHOGONALLY

Copyright International Business Machines Corporation 1984. The specification of this patent document contains material to which a claim of copyright is made. The copyright owner, assignee herein, has no objection to the duplication of the specification but reserves all other copyright rights whatsoever.

BACKGROUND OF THE INVENTION

This invention relates generally to apparatus for optically measuring dimensions with video equipment and, more particularly, to such apparatus as used for automatically and accurately measuring dimensions of small features along two orthogonal axes.

During the manufacture of a printed circuit panel, a large number of through holes or vias is drilled by a multiple spindle drilling machine that is relatively moved from one drilling location to another over the panel. Dimensional accuracy of the hole placement must be assured and the panel must be carefully inspected to ensure that the drilling machine has been accurately positioned. Manual inspection of even a few selected holes makes the cost prohibitive. Accordingly, an automated system of measurement is required.

The automated optical measurement of relatively small dimensions is well-known. Most systems use a moving beam of light that traverses the surface of an object and changes reflectivity as contrasting features are encountered. An example of this method is United Kingdom Patent Specification No. 1,404,311 in which pulses are gated to an accumulator during the time light is reflected from a contrasting feature in the path traced by a small beam. The accumulated pulses become a measure of the feature dimension when the beam velocity is known or when scale marks are sensed during movement. In the case of holes or openings, one solution has been to gate pulses from a fixed frequency oscillator to an integrator or accumulator during the time a relatively moving light beam passes through the opening or impinges on a grid work of opaque lines during the movement. Again, the velocity of the beam is uniform and known to enable conversion to a dimension. Examples of this latter technique are taught in U.S. Pat. Nos. 2,447,024 and 3,546,671.

The holes drilled in printed circuit panels are becoming smaller in diameter as drilling capabilities are improved to enable more circuits and their vias to be placed within a unit area. In addition, the panels are being laminated with more layers so that the aspect ratio, length to diameter, of the hole is increasing. These factors make the usual approaches of light transmittance through the hole or direct reflectance for gating a counter unacceptable because the sensors are inaccurate or incapable at the smaller dimensions. A system using a vidicon camera and magnifying lens, such as that described in U.S. Pat. No. 3,551,052, is necessary to scan the drilled opening. This latter reference, however, is inadequate in determining the location of an opening with respect to a reference and cannot provide a dimensional output as a pulse number since it responds with only a single pulse during each traversal of a contrasting area.

In order to obtain accurate measurement of location, several scans are required to assure that irregularities at the edges of the opening are minimized in influence and that measurements can be taken with a high degree of accuracy, such as the distance of a reference to the edge of the opening or the distance across the opening on a particular scan line. The techniques heretofore known have been unable to perform these required measurements, thereby preventing the desired automating of hole inspections.

OBJECTS AND SUMMARY OF THE INVENTION

It is a primary object of this invention to provide an optical digital scanning system by which the distance of features of an object from a reference can be determined.

Another important object of this invention is to provide an optical scanning system that enables the location of an object feature to be determined relative to a reference by averaging the distance of a plurality of measurements obtained during a plurality of linear scans of the object and feature.

Yet another important object of this invention is to provide a video scanning system in which features on an object can be inspected as to location by selected linear scans of the object and computation of distances and averages thereof from a reference.

The foregoing objects are attained in accordance with the invention by providing video scanning means effective to scan an object a plurality of times in successive scans at a known velocity and sense the boundaries of contrasting features with the scan lines effective to gate pulses of fixed frequency into accumulator means in proportion to the time the scanning beam is sensing a particular feature and thereby convert the length of the scanned feature to a digital value. The scan lines are selected as to those effective for gating the pulses by either feature dimension or desired frequency of scan. The accumulated digital values can be combined after processing by computation means to provide distance values from a reference and deviations from an average.

The measuring system uses high-speed video sensing and includes optics to change magnification to vary the image size examined by the video scanning means and thus advantageously accommodate object features of varying sizes such as those encountered in drilled holes. Chord lengths of the holes are readily selected by setting minimum accumulator values for gated pulses. The use of multiple accumulators allows separate measurements and thus more versatility.

The foregoing and other objects, features and advantages of the invention will be apparent from the following, more particular, description of a preferred embodiment of the invention as illustrated in the accompanying drawing.

DESCRIPTION OF THE PREFERRED EMBODIMENT

Figure 1:
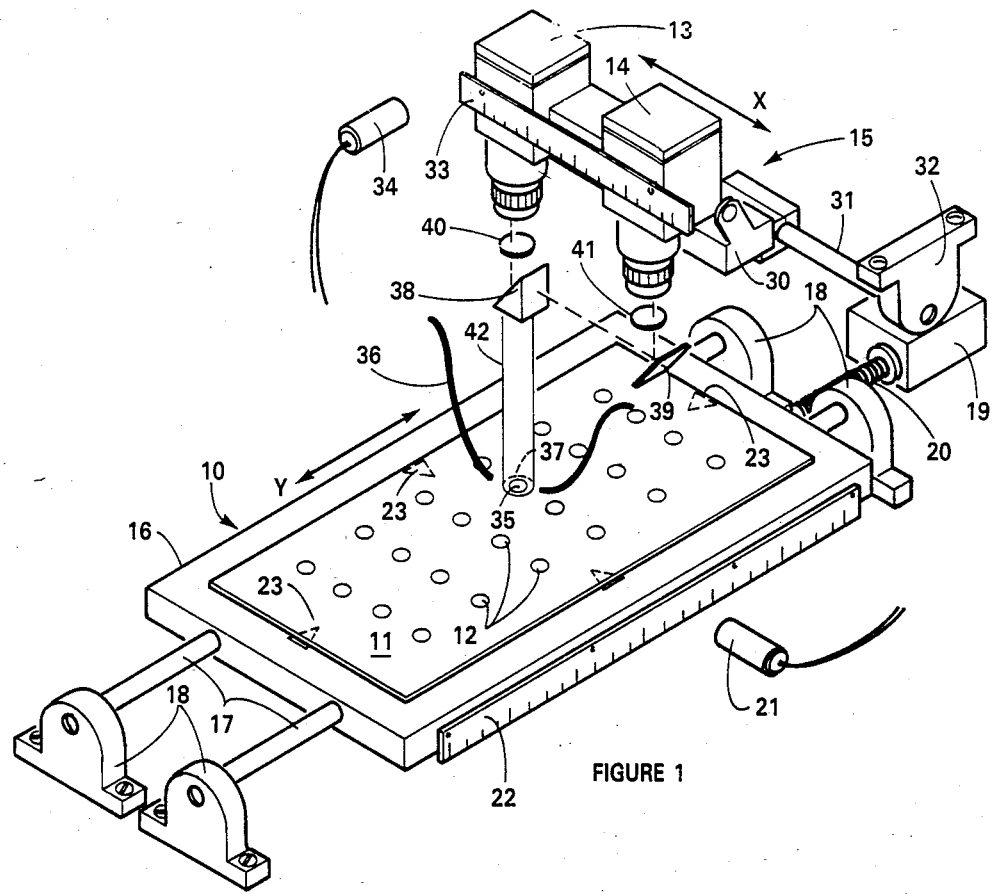
FIG. 1 is a perspective view of apparatus constructed in accordance with the principles of the invention for measuring the locations of holes in a circuit panel.

Referring to FIG. 1, the measuring apparatus comprises generally a table assembly 10 movable along the Y axis carrying a circuit panel 11 having therein drilled holes 12 that are viewed by a pair of overhead video cameras 13, 14 supported for movement along an X axis on a movable carriage assembly 15. Table 16 is mounted for reciprocating motion on guide rods 17 supported in blocks 18. A motor 19 and lead screw 20 can be selectively energized to drive the table to a desired position along the Y axis. Magnitude and direction of motion along that axis is indicated by signals in well-known phase quadrature from a photosensitive optical transducer 21 sensing opaque marks on linear scale 22 secured to table 16. Circuit panel 11 is held in position on the table by locating vee blocks 23.

Drilled holes 12 and panel 11 are viewed by a pair of identical video cameras 13, 14 each oriented along one of the orthogonal X and Y axes to provide images of a selected hole that are displaced 90° from each other. Commercially available video cameras may be used such as Model LSV-1.5/DBA-1 from Sierra Scientific Corp. in Mountain View, Calif. The cameras are supported on a carriage 30 that is movable along the X axis on guide rod 31, supported in hanger blocks 32, only one of which is shown. Camera carriage 30 is moved on guide rod 31 by a selectively operable motor and lead screw, not shown, similar to that for table 16. A linear scale 33 is sensed by photosensitive optical transducer 34 to provide output signals in phase quadrature that can be processed in a well-known manner to indicate magnitude and direction of motion. A selected hole 35 to be viewed is illuminated by light from a source, not shown, delivered through bundles 36 of optical fibers. The selected hole is viewed by cameras 13 and 14 through a collimating lens 37, a beam splitter 38 and mirror 39 and through respective magnifying lenses 40 and 41. Lens 37 is supported in a cylindrical housing or quill 42 that is moved vertically from a retracted position into contact with panel 11 to assure proper focus when video camera images are to be generated.

The inspection system shown is under the control of a larger computer system for achieving automatic inspection procedures. The larger system may include one or more central processing units for controlling positioning of the table, cameras shutters and lens focusing among other operations. The individual hole calculations, selection of useful data, and averaging of data is under the control of a microprocessor 60, to be subsequently described.

Inspection of selected drilled holes is undertaken to determine the coordinate locations of their centers with respect to a home position. This is done initially by placing panel 11 on table 16 and moving the table to a "home" position that is a mark on one of locator blocks 23. All other locator blocks can also be checked. The video measuring apparatus is adjusted to provide a 0—0 coordinate location for the home position at the monitor screen center by counting pixels to its midpoint. Thereafter, the motion of the table and camera carriage assemblies 10 and 15 can be measured by the photosensitive transducers 21, 34 and respective scales 22, 33.

A hole whose diameter and location are to be determined is imaged by both orthogonally oriented video cameras oriented so that the measurements can be orthogonally defined. The measurements can be done simultaneously with the described arrangement to achieve efficiency. Since both camera systems operate in a similar manner, only the system for the X axis will be described in detail.

Figure 2:
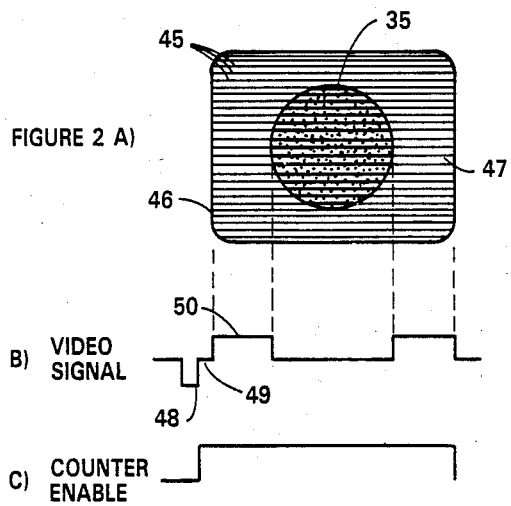
FIGS. 2a–2c are a diagram of an image of a circuit panel and hole as seen with the apparatus in FIG. 1 and waveforms produced from said image.

An image of hole 35 (FIG. 1) as seen by vidicon camera 13 and seen in a monitor, not shown, is shown in FIG. 2a. The camera is typically a non-interlacing type that has 525 scan lines of video in a frame. The scan lines 45 each start from the left and move right across the field of view. The size of the imaged drilled hole is determined by the magnifying lens 40 for the X axis and this enables a range of hole diameters to be scanned merely by changing the magnification. In the measuring system of the invention, the location of the center of hole 35 is defined with respect to the left edge 46 of the frame as seen in FIG. 2a. This requires that the distance from the left frame edge to the center of the hole has to be measured. The distance that the hole center lies from the frame edge 46 is measured by gating fixed frequency pulses, such as from an oscillator to two different accumulators or counters during the generation of a scan line. A vidicon operating at 15 Hz completes a scan line each 126 usec. Since the scan line velocity is a known value and the pulse frequency is fixed, the accumulator values represent distance from the time each accumulator is gated until blocked.

Figure 3:
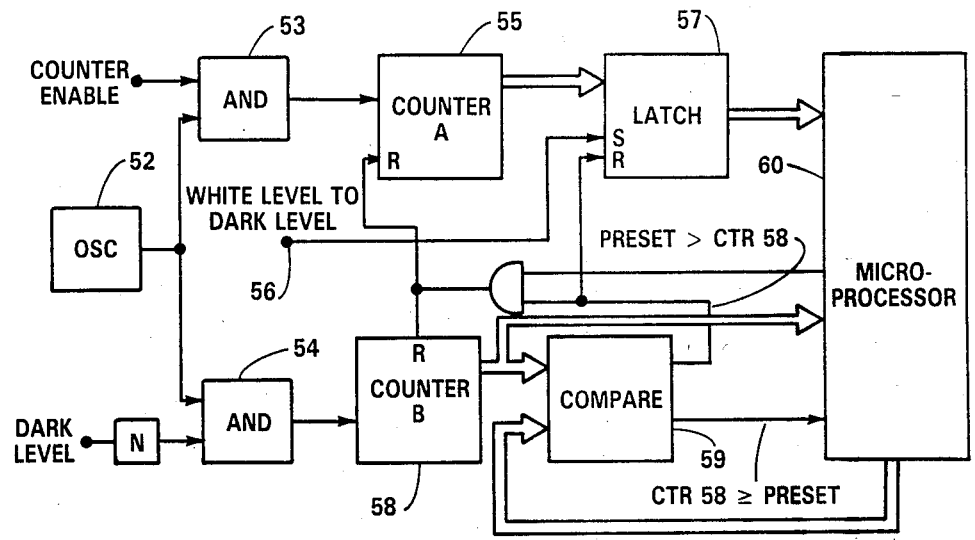
FIG. 3 is a diagram of a circuit for determining distances with data from the apparatus shown in FIG. 1.

A diagram of a circuit and microprocessor for determining the distance from the reference edge to a hole edge and the center of the hole is shown in FIG. 3. The microprocessor shown is a model 6800 available from the Motorola Corporation at Schaumburg, Illinois. The circuit uses multiple inspection scans that produce signal levels shown in FIGS. 2b and 2c as gating signals to control the accumulation of pulses representing distance. In FIG. 2b, the waveform shown represents that of a single horizontal scan line 47 across the approximate midpoint of the monitor view of a portion of the circuit panel and drilled hole 35. The negative excursion 48 represents the horizontal synchronizing pulse for the scan line; signal level 49 represents a dark surface; and level 50 represents a reflective or light surface. Thus, the scan line trace, after synchronization, rises to level 50 indicating a light or reflective panel surface, then later falls to a dark level 49 as the hole edge is encountered where it remains until rising again after leaving the hole and again sensing panel surface. These levels are used to gate oscillator pulses into different counters. A further gating signal is shown in FIG. 2c where a counter enable signal reaches an activating level at the termination of horizontal synchronizing pulse 47 in FIG. 2b.

In FIG. 3, an oscillator 52 of fixed frequency, such as 10 Mhz, has its output connected as one input to AND gate 53 and one input to AND gate 54. When AND 53 is conditioned by a counter enable signal from FIG. 2c, indicating that a scan line has started, pulses will be transmitted to counter 55. Counter 55 will accumulate pulses until the transition in the light level to the dark level or from level 50 to level 49 on the trace in FIG. 2b. At that transition at terminal 56, a set signal to latch 57 will lock the counter value in the latch. This value represents the distance from the left side 46 of the image in FIG. 2a to the left edge of hole 35. The second input to AND 54 is from an inverted vidicon output and is effective from the stable horizontal synchronization pulse 48 at the dark levels 49 to condition AND gate 54 so that oscillator pulses are directed to counter 58. During the time that the dark level is present at AND 54, counter 58 will accumulate pulses and, as the scan line senses the far edge of the hole, the dark level signal will terminate signaling computer 60 so that counter 58 contains a value representative of a chord length of hole 35. The dark-to-light signal causes the microprocessor 60 to initiate a comparison of the value in counter 58 with a preset value.

During the generation of scan lines, it is desirable that only selected scan lines be considered for measurement. At the conclusion of a scan line, the accumulated count in counter 58 is compared at compare circuit 59 with a preset value from microprocessor 60. If the accumulated value of counter 58 is less than the preset value, a reset signal is transmitted from compare circuit 59 to both counter 58 and latch 57. This action erases the accumulated values in counter 58 and latch 57 so that the scan line data is not used. A value that is too small in counter 58 indicates either that the scan line did not encounter a hole 35 in FIG. 2a or that the chord portion across the hole was too short to be of interest. Thus, the preset value is a technique of screening acceptable scan lines through the setting of minimum lengths.

Figure 4:
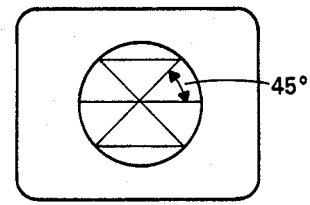
FIG. 4 is a diagram of an image of a circuit panel hole illustrating measurement limits thereof.

If the accumulated count in counter 58 is equal to or greater than the preset value in comparator 59, a signal is sent to microprocessor 60 to store the value of latch 57 and the value of counter 58 for that particular scan line within the microprocessor for later computation, such as adding the value of the latch 57 to half the value of the counter 58 to determine, for that scan line, the distance of the X-coordinate of the center of the hole 35 from the frame edge 46 of the video frame. Counters 55 and 58 and latch 57 are then reset for the next scan line. The 525 scan lines provided by the vidicon are in excess of the number required to make a reliable measurement. Therefore, the microprocessor is programmed to use one out of any desired number such as 5 or 10 scan lines, and is programmed to add the value of the latch 57 to half the value of the counter 58 only for each of the selected ones of said scan lines 45 resulting in a number of values which may be averaged by the microprocessor to significantly improve the determination of the distance of the X-coordinate of the center of the hole 35 from the frame edge 46 of the video frame. The vertical and horizontal sync pulses are used for counting frames and scan lines. This affords a technique of reasonably limiting the number of scan lines to be reviewed. As mentioned previously, the preset value placed by the microprocessor 60 in compare circuit 59 can be nearly any desired value. One technique of determining this value is shown in FIG. 4 and is to determine the theoretical lengths of chords between the intersections of a pair of diameters with the circumference when oriented at 45° with a third diameter parallel to the scan lines. The resulting value can be used as a minimum chord length and changed, of course, for different sizes of holes.

The invention offers significant improvement in determining the location of the center of a hole by using a plurality of linear scans to sense the hole edge. Selection and use of a predetermined number of scans, such as sixteen, permits the averaging of results that provide greater accuracy. A deviation of the computed hole center location from the average for each of the plurality of chords is easily calculated, and those values widely varying or beyond established limits can be discarded. Irregular hole edges can be detected in this manner to prevent erroneous conclusions.

Figure 5:
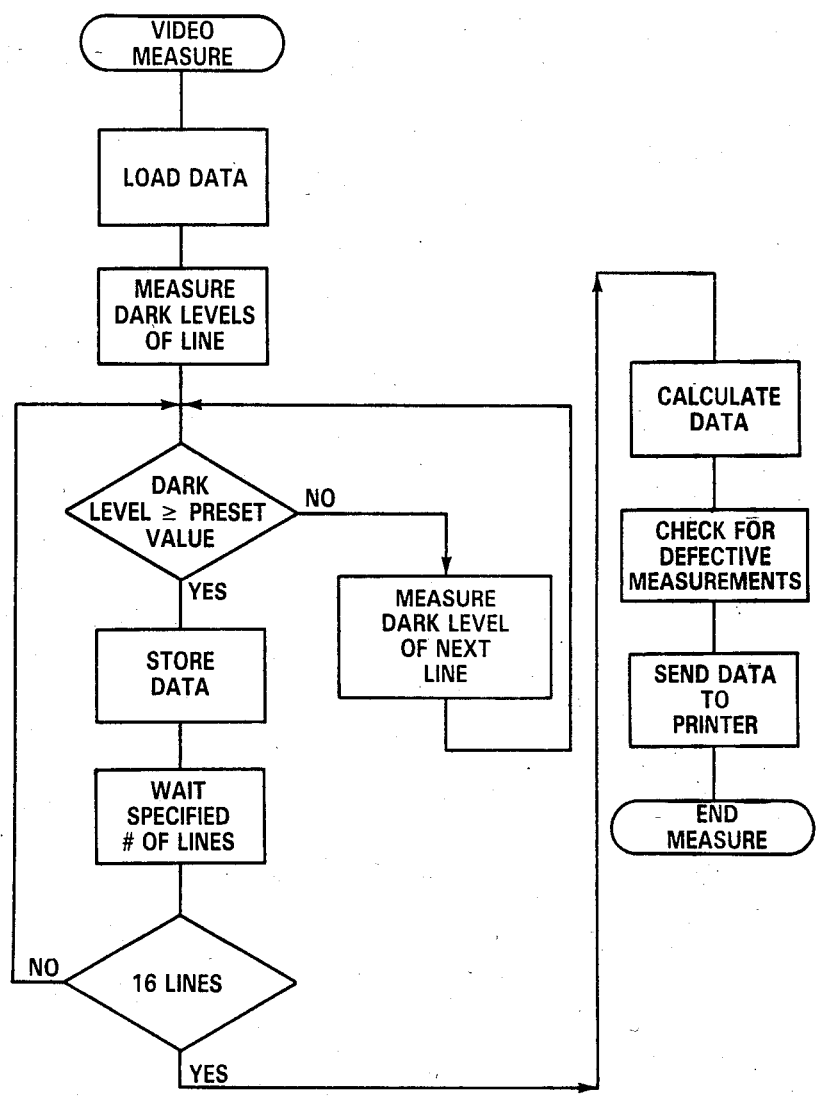
FIG. 5 is a summary flow chart for processing measurement data obtained with the apparatus shown in FIG. 1.
Figure 6:
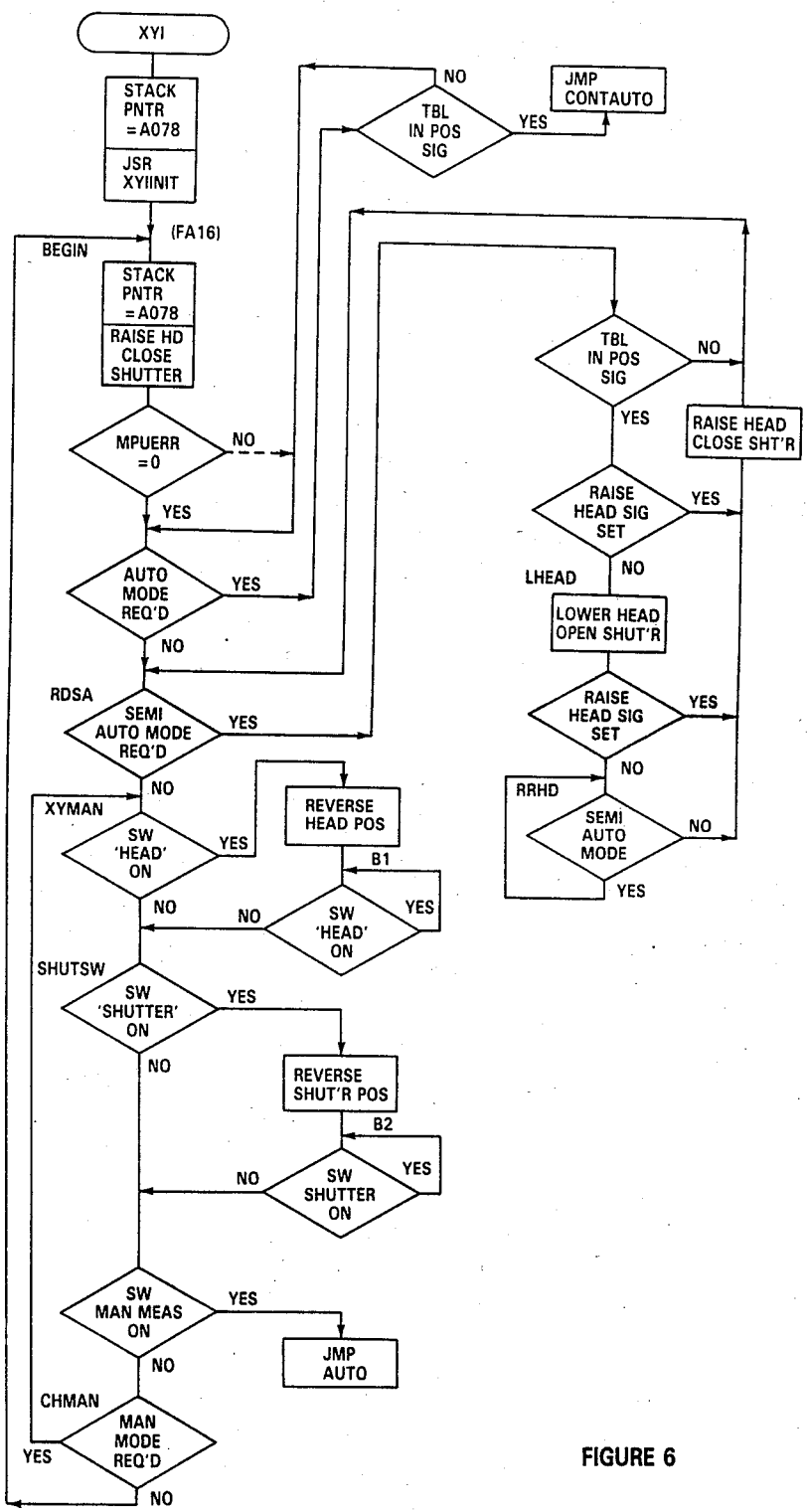
FIGS. 6–12 are flow charts showing a data processing technique in detail for obtaining measurement results.
Figure 7:
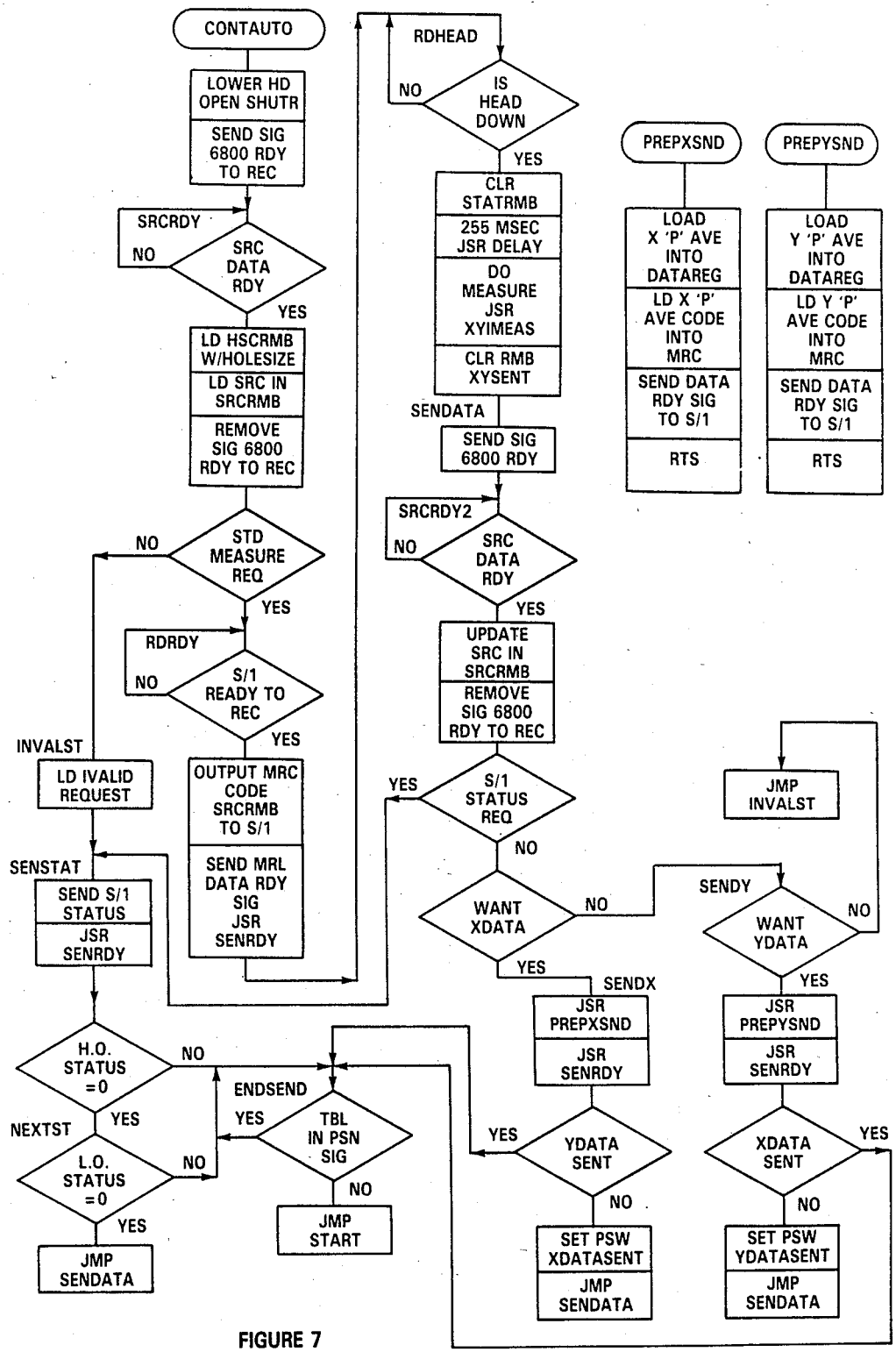
Figure 8:
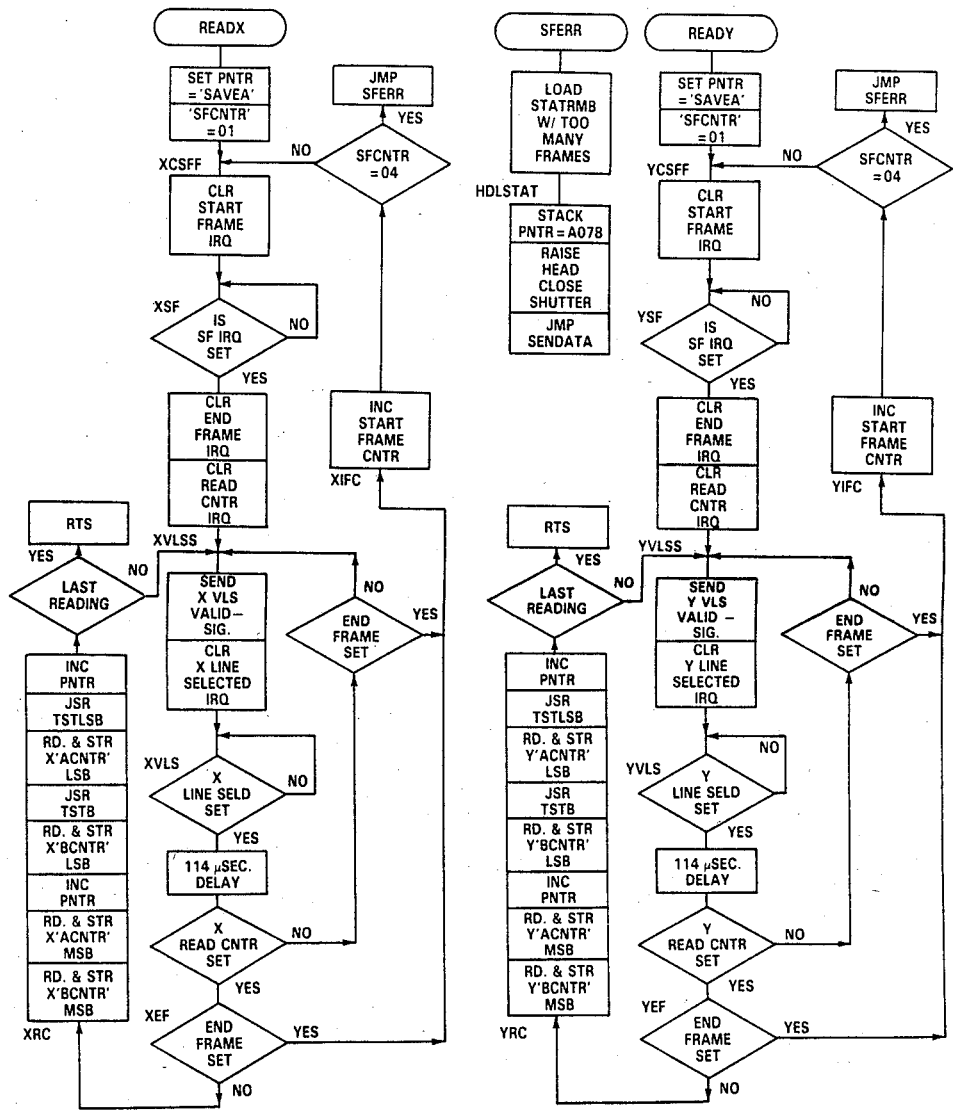
Figure 9:
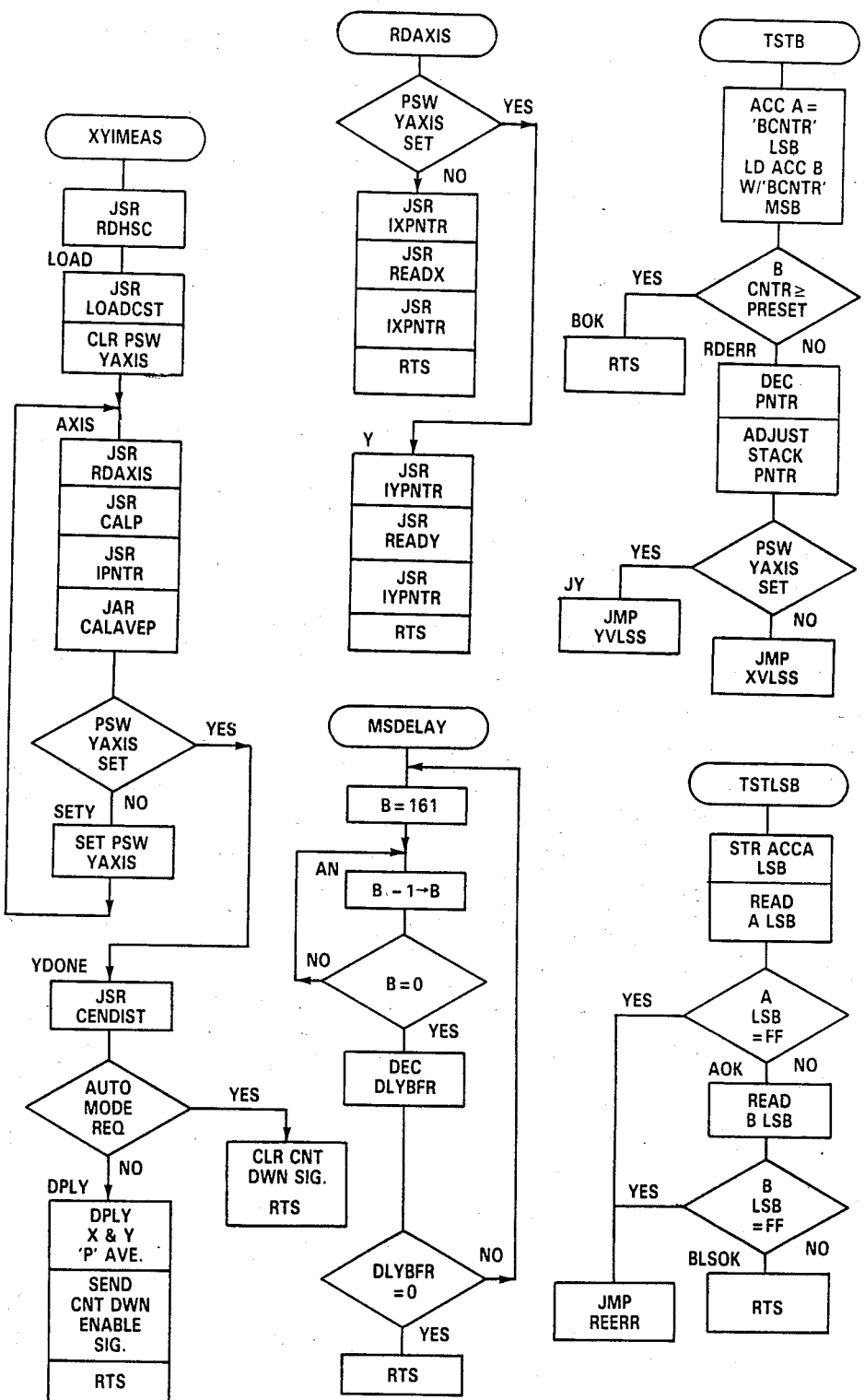
Figure 10:
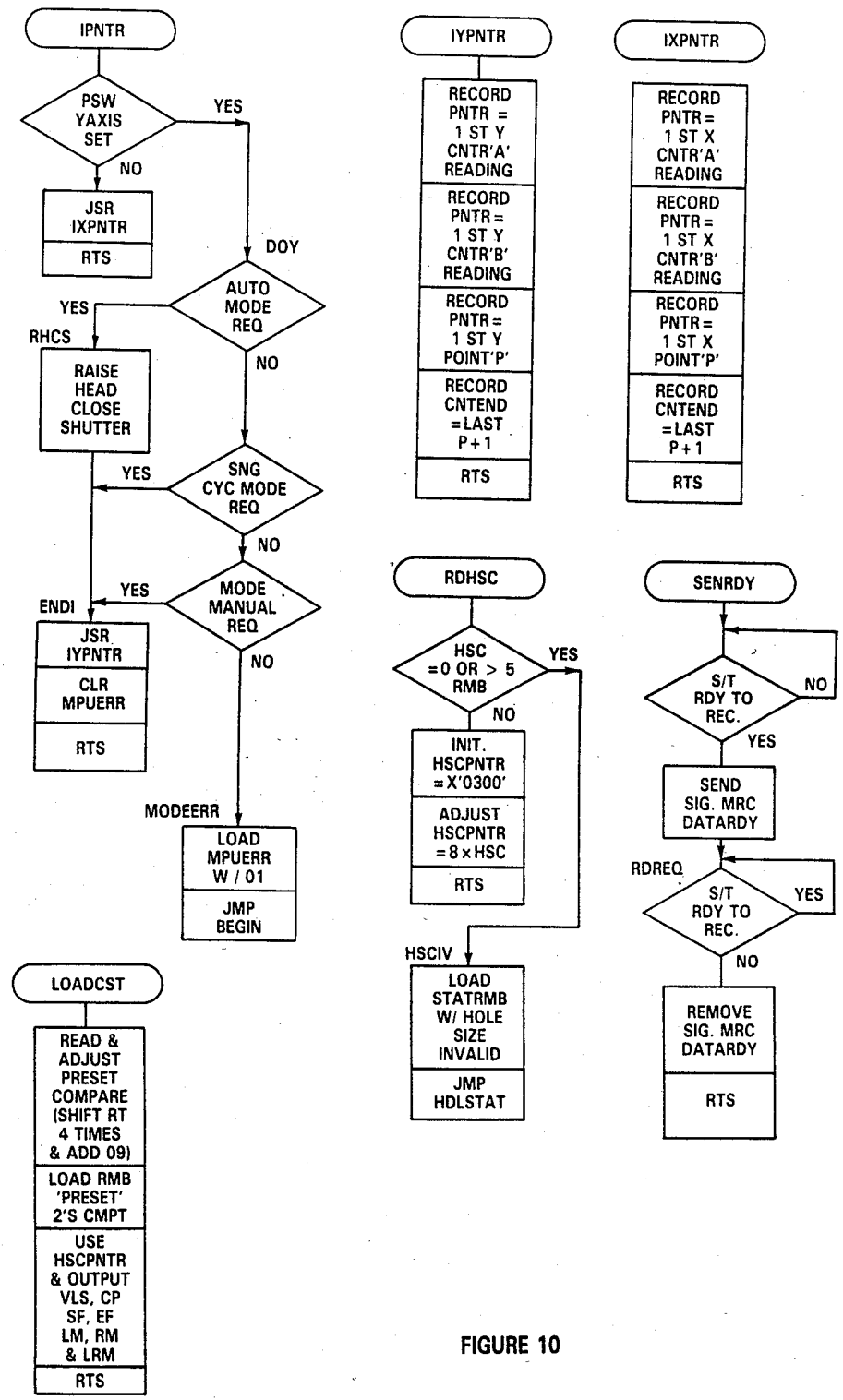
Figure 11:
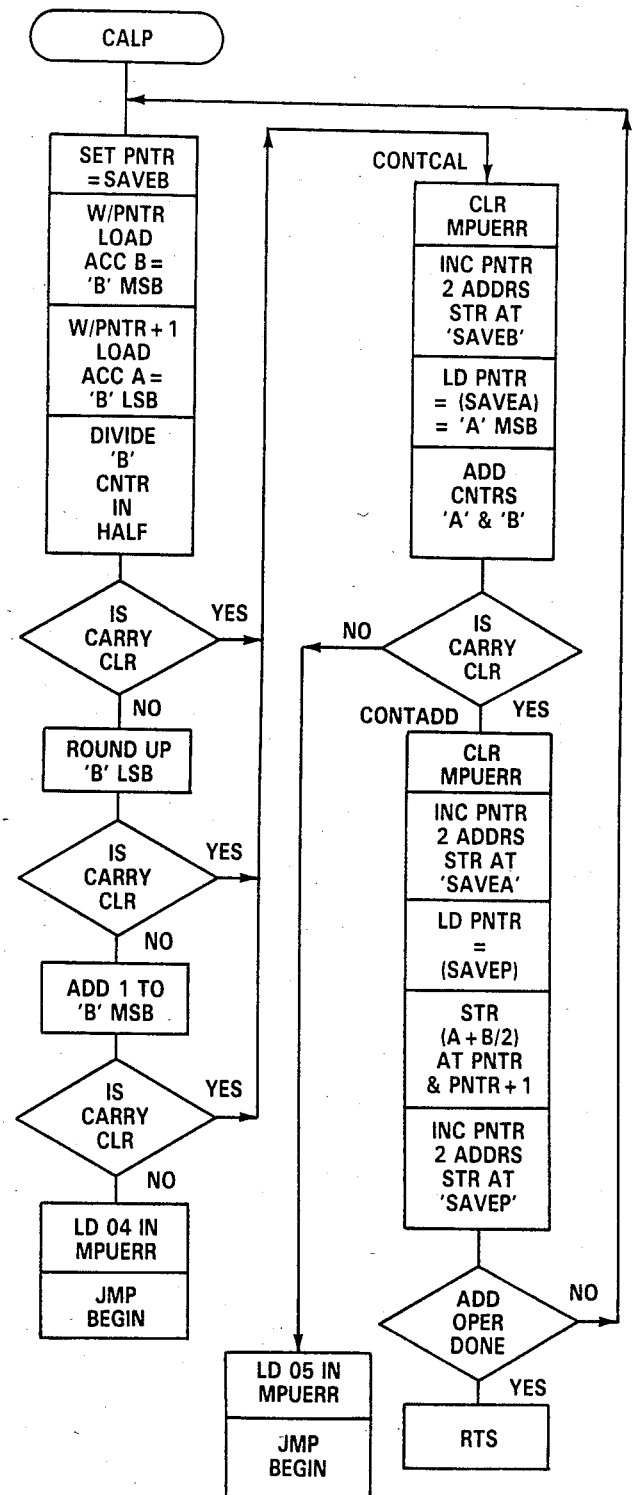
Figure 11A:
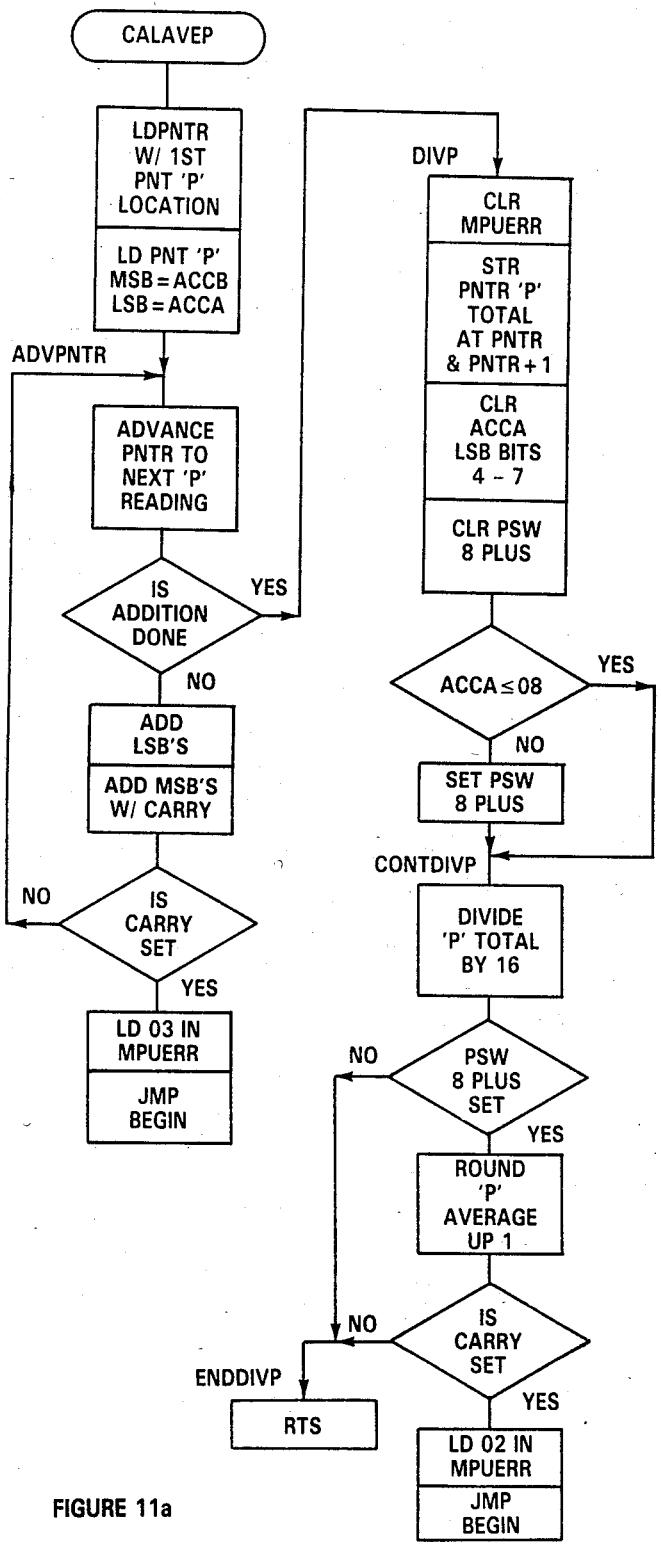
Figure 12:
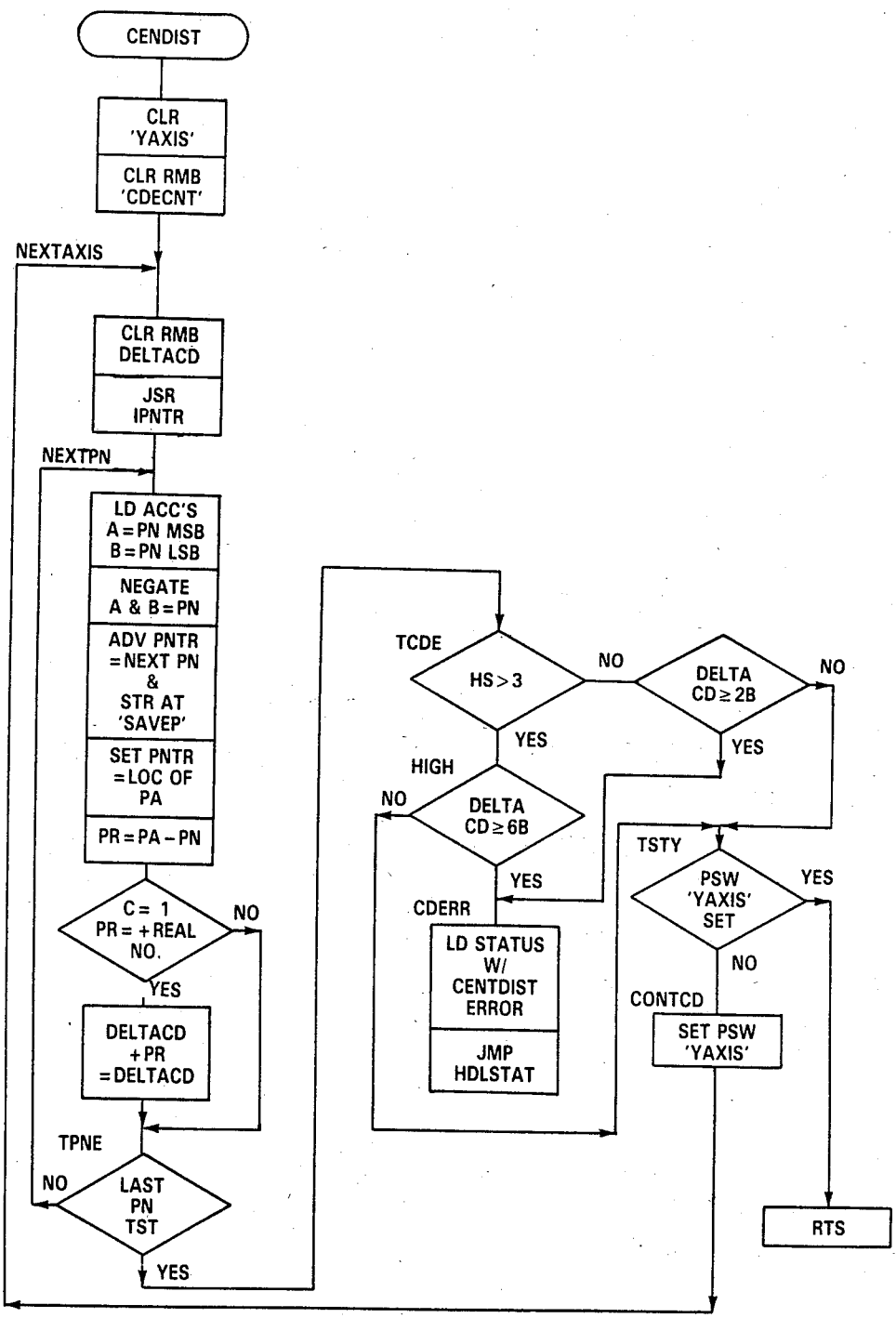

A computer data flow diagram is shown in FIG. 5 that describes the video portion of the inspection process. Sixteen chords are illustrated as the total used for a measurement. The number, however, can be changed to other values, as desired.

As mentioned above, the automatic hole inspection process is controlled by a general purpose computing system. The microprocessor is a part of and communicates with this system for the computation of specific hole locations data. A preferred method of implementing the inspection system is shown in FIGS. 6-12; other techniques of the implementation can readily be devised by others skilled in the art. Source code by which the inspection system is preferably enabled is shown in appendix A.

While the invention has been particularly shown and described with reference to a preferred embodiment thereof, it will be understood by those skilled in the art that various changes in form and details may be made therein without departing from the spirit and scope of the invention.

DOCKET NO. EN984010

APPENDIX A

```
****************************************************************
****************************************************************
               X Y INSPECTION MACHINE PROGRAM
       COPYRIGHT INTERNATIONAL BUSINESS MACHINES CORPORATION 1984
****************************************************************
****************************************************************

******* XYIPRT *******
    SAVEA    EQU    X'0000'        SAVE COUNTER 'A' POINTER LOCATION
    SAVEB    EQU    X'0002'        SAVE COUNTER 'B' POINTER LOCATION
    SAVEP    EQU    X'0004'        SAVE POINT 'P' POINTER LOCATION
    CNTEND   EQU    X'0006'        SAVE END OF RECORDED LOCATION
    SWCNTR   EQU    X'0008'        SOFTWARE COUNTER
    HSCPNTR  EQU    X'0009'        RECORD HOLE SIZE CODE POINTER
    HSCRMB   EQU    X'000B'        HOLE SIZE CODE
    SFCNTR   EQU    X'000C'        START FRAME COUNTER
```

| | | | |
|---|---|---|---|
| SRCRMB | EQU | X'000D' | RECORD SCR AND HSC |
| XYSENT | EQU | X'000E' | BIT8 = XSENT, BIT7 = YSENT |
| STATRMB | EQU | X'000F' | RECORD STATUS |
| DLYBFR | EQU | X'0011' | DELAY BUFFER USED W/ MSDELAY RTNE |
| PSW1 | EQU | X'0012' | PROGRAM SWITCH 1 |
| PSW2 | EQU | X'0013' | PROGRAM SWITCH 2 |
| HORZRMB | EQU | X'0014' | RECORD HORIZONTAL CALCULATIONS |
| MPUERR | EQU | X'0017' | MPU ERROR STATUS |
| SAVEMP | EQU | X'0018' | SAVE POINT 'MP' POINTER LOCATION |
| PRESET | EQU | X'001A' | RECORD COMPARE PRESET VALUE |
| CDECNT | EQU | X'001C' | CENTER DISTRIBUTION ERROR COUNT |
| DELTACD | EQU | X'001D' | TOTAL SUM OF + CENT. DIST. ERRORS |
| CNTRXA | EQU | X'0100' | RECORD X AXIS, COUNTER 'A' READINGS |
| ENDXA | EQU | X'0120' | |
| CNTRXB | EQU | X'0150' | RECORD X AXIS, COUNTER 'B' READINGS |
| ENDXB | EQU | X'0170' | |
| PNTX | EQU | X'01A0' | RECORD X AXIS, POINT 'P' CALCULATION |
| ENDXP | EQU | X'01C0' | RECORD X AXIS, POINT 'P' AVERAGE |
| MPNTX | EQU | X'01E0' | RECORD X AXIS, 4 POINT 'P' AVERAGES |
| ENDMXP | EQU | X'01F0' | RECORD X AXIS, AVE. OF 4 ('P'AVES) |
| CNTRYA | EQU | X'0200' | RECORD X AXIS, COUNTER 'A' READINGS |
| ENDYA | EQU | X'0220' | |
| CNTRYB | EQU | X'0250' | RECORD X AXIS, COUNTER 'B' READINGS |
| ENDYB | EQU | X'0270' | |
| PNTY | EQU | X'02A0' | RECORD X AXIS, POINT 'P' CALCULATION |
| ENDYP | EQU | X'02C0' | RECORD X AXIS, POINT 'P' AVERAGE |
| MPNTY | EQU | X'02E0' | RECORD X AXIS, 4 POINT 'P' AVERAGES |
| ENDMYP | EQU | X'02F0' | RECORD X AXIS, AVE. OF 4 ('P'AVES) |
| H0 | EQU | X'0300' | |
| H1 | EQU | X'0308' | |
| H2 | EQU | X'0310' | |
| H3 | EQU | X'0318' | |
| H4 | EQU | X'0320' | |
| H5 | EQU | X'0328' | |
| H6 | EQU | X'0330' | |
| H7 | EQU | X'0338' | |
| H8 | EQU | X'0340' | |
| H9 | EQU | X'0348' | |
| HA | EQU | X'0350' | |
| HB | EQU | X'0358' | |
| HC | EQU | X'0360' | |
| HD | EQU | X'0368' | |
| HE | EQU | X'0370' | |
| HF | EQU | X'0378' | |
| ENDCST | EQU | X'0380' | |
| X1AREG | EQU | X'4000' | CNTR 'B' LSB |
| X1ACTR | EQU | X'4001' | CONTROL REG |
| X1BREG | EQU | X'4002' | CNTR 'B' MSB & COMP PRESET LSB |
| X1BCTR | EQU | X'4003' | CONTROL REG |
| X2AREG | EQU | X'4004' | COMP PRESET MSB |
| X2ACTR | EQU | X'4005' | CONTROL REG |
| X2BREG | EQU | X'4006' | CNTR 'A' LSB |
| X2BCTR | EQU | X'4007' | CONTROL REG |
| X3AREG | EQU | X'4008' | CNTR 'A' MSB & V L SELECTOR LSB |
| X3ACTR | EQU | X'4009' | CONTROL REG |
| X3BREG | EQU | X'400A' | V L SELECTOR MSB |
| X3BCTR | EQU | X'400B' | CONTROL REG |
| X4AREG | EQU | X'4200' | DPLY X POINT 'P' AVERAGE LSB |
| X4ACTR | EQU | X'4201' | CONTROL REG |
| X4BREG | EQU | X'4202' | DPLY X POINT 'P' AVERAGE MSB |
| X4BCTR | EQU | X'4203' | CONTROL REG |
| CHRREG | EQU | X'4204' | Y HORIZONTAL DPLY 'P' AVERAGE |
| CHRCTR | EQU | X'4205' | CONTROL REG |

```
Y1AREG    EQU    X'4206'              CNTR 'B' LSB
Y1ACTR    EQU    X'4207'              CONTROL REG
Y1BREG    EQU    X'4208'              CNTR 'B' MSB & COMP PRESET LSB
Y1BCTR    EQU    X'4209'              CONTROL REG
Y2AREG    EQU    X'420A'              COMP PRESET MSB
Y2ACTR    EQU    X'420B'              CONTROL REG
Y2BREG    EQU    X'4400'              CNTR 'A' LSB
Y2BCTR    EQU    X'4401'              CONTROL REG
Y3AREG    EQU    X'4402'              CNTR 'A' MSB
Y3ACTR    EQU    X'4403'              CONTROL REG
Y3BREG    EQU    X'4404'              V L SELECTOR MSB
Y3BCTR    EQU    X'4405'              CONTROL REG
Y4AREG    EQU    X'4406'              Y DPLY POINT 'P' AVERAGE MSB
Y4ACTR    EQU    X'4407'              CONTROL REG
Y4BREG    EQU    X'4408'              Y DPLY POINT 'P' AVERAGE LSB
Y4BCTR    EQU    X'4409'              CONTROL REG
SFREG     EQU    X'4600'              START FRAME
SFCTR     EQU    X'4601'              CONTROL REG
EFREG     EQU    X'4602'              END FRAME
EFCTR     EQU    X'4603'              CONTROL REG
LMREG     EQU    X'4604'              LEFT SIDE MARGIN
LMCTR     EQU    X'4605'              CONTROL REG
LRMREG    EQU    X'4606'              LEFT & RIGHT SIDE MARGIN
LRMCTR    EQU    X'4607'              CONTROL REG
RMREG     EQU    X'4608'              RIGHT SIDE MARGIN
RMCTR     EQU    X'4609'              CONTROL REG
T13CTR    EQU    X'5000'              CONTROL REG 1 OR CONTROL REG 2
T2CTR     EQU    X'5001'              CONTROL REG 2 / RD STATUS REG
BFR1      EQU    X'5002'              LOAD TMR1 MSB / RD TMR1 CNTR MSB
TMR1      EQU    X'5003'              LOAD TMR1 LSB / RD TMR1 CNTR LSB
BFR2      EQU    X'5004'              LOAD TMR2 MSB / RD TMR2 CNTR MSB
TMR2      EQU    X'5005'              LOAD TMR2 LSB / RD TMR2 CNTR LSB
BFR3      EQU    X'5006'              LOAD TMR3 MSB / RD TMR3 CNTR MSB
TMR3      EQU    X'5007'              LOAD TMR3 LSB / RD TMR3 CNTR LSB
DISREG    EQU    X'8020'              DISPLAY SEGMENTS
DISCTR    EQU    X'8021'
SCNREG    EQU    X'8022'              KEYBOARD/DISPLAY SCAN ('E' KEY READ)
SCNCTR    EQU    X'8023'
HDOREG    EQU    X'9000'              HEAD OUTPUT REG
HDOCTR    EQU    X'9001'
HDIREG    EQU    X'9002'              HEAD INPUT REG
HDICTR    EQU    X'9003'
DATAREG   EQU    X'9200'              OUTPUT MEASUREMENT DATA TO S/1
DATACTR   EQU    X'9201'
MRCREG    EQU    X'9202'              MRC CODE AND DATA TO S/1
MRCCTR    EQU    X'9203'
MINREG    EQU    X'9204'              INPUT FROM S/1
MINCTR    EQU    X'9205'
MOREG     EQU    X'9206'              OUTPUT TO S/1
MOCTR     EQU    X'9207'
SRCREG    EQU    X'920A'              SRC CODES AND HOLE SIZES FROM S/1
SRCCTR    EQU    X'920B'
*---------------------------------------------------------------------*
* DEFINITION: $PP,$PO,$VV,$SS,$EE,$LL,$LR,$RR        HSC   DIA
* - PPPO = COMPARATOR PRESET VALUE
*          -FIRST BYTE PP IS OUTPUT ON (PIA)S 'X2AREG' & 'Y2AREG'
*          -SECOND BYTE PO IS OUTPUT ON (PIA)S 'X1BREG' & 'Y1BREG'
* - VV   = VIDEO LINE SELECTOR VALUE
*          -THIRD BYTE VV IS OUTPUT ON (PIA)S 'X3BREG' & 'Y3BREG'
* - SS   = START FRAME VALUE
*          -FOURTH BYTE SS IS OUTPUT ON (PIA) 'SFREG'
* - EE   = END FRAME VALUE
*          -FIFTH BYTE EE IS OUPTUT ON (PIA) 'EFREG'
* - LL   = LEFT SIDE MARGIN VALUE
```

```
*              -SIXTH BYTE LL IS OUTPUT ON (PIA) 'LMREG'
* - LR   = LEFT & RIGHT SIDE MARGIN VALUE (HALF BYTE EACH)
*              -SEVENTH BYTE LR IS OUTPUT ON (PIA) 'LRMREG'
* - RR   = RIGHT SIDE MARGIN VALUE
*              -EIGHTH BYTE RR IS OUTPUT ON (PIA) 'RMREG'
* - HSC  = HOLE SIZE CODE FROM S/1, INPUT ON (PIA) 'SRCREG'
* - DIA  = HOLE DIAMETER REPRESENTED BY THE HSC
* CONSTANTS FOR VARIOUS HOLE SIZES
*-----------------------------------------------------------------*
****-------------------------------------------------------------****
****    THESE CONSTANTS ARE FOR XY #3      DJS 10-12-83          ****
****-------------------------------------------------------------****
*          ORG    X'F800'
*H0ROM     DC     X'0000000000000000'  NOT USED INVALID HSC
*H1ROM     DC     X'0530010CFA001FFF'  01  .010      25 MM LENS
*H2ROM     DC     X'0970030CFA001FFF'  02  .016      25 MM LENS
*H3ROM     DC     X'0AA0040CFA001FFF'  03  .018      25 MM LENS
*H4ROM     DC     X'09200355B1204318'  04  .033      50 MM LENS
*H5ROM     DC     X'0E000645C11D134B'  05  .048      50 MM LENS
*H6ROM     DC     X'0760010CFA001FFF'  06  .024      50 MM LENS(LOCATERS
*H7ROM     DC     X'0DA0070CFA001FFF'  07  .024      25 MM LENS(LOCATERS
*H8ROM     DC     X'0000000000000000'  HSC 8 OR GREATER NOT USED AT THIS
*H9ROM     DC     X'0000000000000000'  TIME
*HAROM     DC     X'0000000000000000'
*HBROM     DC     X'0000000000000000'
*HCROM     DC     X'0000000000000000'
*HDROM     DC     X'0000000000000000'
*HEROM     DC     X'0000000000000000'
*HFROM     DC     X'0000000000000000'
****-------------------------------------------------------------****
****    THESE CONSTANTS ARE FOR XY #2      DJS 10-12-83          ****
****-------------------------------------------------------------****
           ORG    X'F800'
H0ROM      DC     X'0000000000000000'  NOT USED INVALID HSC
H1ROM      DC     X'0530010CFA001FFF'  01  .010      25MM LENS
H2ROM      DC     X'0AF0040CFA001FFF'  02  .016      25MM LENS
H3ROM      DC     X'0C60060CFA001FFF'  03  .018      25MM LENS
H4ROM      DC     X'1680060CFA001FFF'  04  .033      NOT USED ON XY #2
H5ROM      DC     X'21F00D0CFA001FFF'  05  .048      NOT USED ON XY #2
H6ROM      DC     X'0000000CFA001FFF'  06            SPARE
H7ROM      DC     X'0F30060CFA001FFF'  07  .024      25MM LENS (LOCATERS)
H8ROM      DC     X'0000000000000000'            NOTE!!!!!!!!!!!
H9ROM      DC     X'0000000000000000'            AT PRESENT TIME(10-12-83),
HAROM      DC     X'0000000000000000'            XY #2 ONLY HAS A 25 MM LENS
HBROM      DC     X'0000000000000000'            CAPABILITY. THEREFORE ONLY
HCROM      DC     X'0000000000000000'            HSC OF 1,2,3,AND 7 ARE
HDROM      DC     X'0000000000000000'            USED.
HEROM      DC     X'0000000000000000'
HFROM      DC     X'0000000000000000'
*                       XYI - MACHINE CONSTANTS
*    DIAM.   HSC    EPROM     RAM     LENS
*    .010"   H1     F808      0308    25MM
*    .016"   H2     F810      0310    25MM
*    .018"   H3     F818      0318    25MM
*    .033"   H4     F820      0320    50MM    XY #3   ONLY
*    .048"   H5     F828      0328    50MM    XY #3   ONLY
*    .024"   H6     F830      0330    50MM
*    .024"   H7     F838      0338    25MM
*            H8     F840      0340
*            H9     F848      0348
*            HA     F850      0350
*            HB     F858      0358
*            HC     F860      0360
*            HD     F868      0368
```

```
*         HE      F870    0370
*         HF      F878    0378
****--------------------------------------------------------------****
**** XYI INITIALIZATION RTNE                                      ****
****--------------------------------------------------------------****
* ACCESS DATA DIRECTION REGISTERS
XYIINIT   CLR     X1ACTR
          CLR     X1BCTR
          CLR     X2ACTR
          CLR     X2BCTR
          CLR     X3ACTR
          CLR     X3BCTR
          CLR     X4ACTR
          CLR     X4BCTR
          CLR     Y1ACTR
          CLR     Y1BCTR
          CLR     Y2ACTR
          CLR     Y2BCTR
          CLR     Y3ACTR
          CLR     Y3BCTR
          CLR     Y4ACTR
          CLR     Y4BCTR
          CLR     SFCTR
          CLR     EFCTR
          CLR     LMCTR
          CLR     LRMCTR
          CLR     RMCTR
          CLR     CHRCTR
          CLR     HDOCTR
          CLR     HDICTR
          CLR     DATACTR
          CLR     MRCCTR
          CLR     MINCTR
          CLR     MOCTR
          CLR     SRCCTR
* ESTABLISH INPUT & OUTPUT DATA BITS
******** ALL BITS = INPUT
          CLR     X1AREG
          CLR     X2BREG
          CLR     Y1AREG
          CLR     Y2BREG
          CLR     SRCREG
          CLR     HDIREG
          CLR     MINREG
******** ALL BITS = OUTPUT
          LDAA    X'FF',I
          STAA    X2AREG
          STAA    X3BREG
          STAA    X4AREG
          STAA    X4BREG
          STAA    CHRREG
          STAA    Y2AREG
          STAA    Y3BREG
          STAA    Y4AREG
          STAA    Y4BREG
          STAA    SFREG
          STAA    EFREG
          STAA    LMREG
          STAA    LRMREG
          STAA    RMREG
          STAA    HDOREG
          STAA    DATAREG
          STAA    MRCREG
          STAA    MOREG
```

```
******** BITS 0-3 = INPUT ; BITS 4-7 = OUTPUTS
        LDAA   X'F0',I
        STAA   X1BREG
        STAA   X3AREG
        STAA   Y1BREG
        STAA   Y3AREG
* INITIALIZE CONTROL REGISTERS (IRQ)S & ACCESS DATA REGISTERS
        LDAA   X'04',I
        STAA   X1ACTR
        STAA   X1BCTR
        STAA   X2ACTR
        STAA   X2BCTR
        STAA   X3BCTR
        STAA   X4BCTR
        STAA   CHRCTR
        STAA   SFCTR
        STAA   EFCTR
        STAA   LMCTR
        STAA   LRMCTR
        STAA   RMCTR
        STAA   HDOCTR
        STAA   HDICTR
        STAA   DATACTR
        STAA   MRCCTR
        STAA   MINCTR
        STAA   MOCTR
        STAA   SRCCTR
        LDAA   X'B0',I           TURN ON "MICRO ON LINE",6800
        STAA   MOREG             DATA NOT RDY & 6800 REC NOT RDY
        CLR    HDOREG            RAISE HEAD, CLOSE SHUTTER
        LDAA   X'3C',I
        STAA   X3ACTR
        LDAA   X'34',I
        STAA   X4ACTR
        LDAA   X'04',I
        STAA   Y1ACTR
        STAA   Y1BCTR
        STAA   Y2ACTR
        STAA   Y2BCTR
        STAA   Y3BCTR
        STAA   Y4BCTR
        LDAA   X'3C',I
        STAA   Y3ACTR
        LDAA   X'34',I
        STAA   Y4ACTR
        LDAA   X'10',I
        STAA   X4AREG            INITIALIZE HORIZONTAL CROSSHAIR
        CLR    CHRREG
        CLR    PSW1
        CLR    PSW2
        CLR    XYSENT
        CLR    MPUERR
*----------------------------------------------------------------*
* TRANSFER HOLE SIZE CONSTANTS FROM ROM TO RAM
*----------------------------------------------------------------*
        LDX    H0,I
        STX    SAVEA
        LDX    HOROM,I
        STX    SAVEB
AGAIN   LDX    SAVEB
        LDAA   00,X
        INX
        STX    SAVEB
        LDX    SAVEA
```

```
            STAA    00,X
            INX
            STX     SAVEA
            CPX     ENDCST,I
            BNE     AGAIN
*----------------------------------------------------------------------*
*               INITIALIZE PTM                                         *
*----------------------------------------------------------------------*
            LDAA    X'FA',I                 INIT X & Y TIMERS
            LDAB    X'FB',I
            STAA    T2CTR                   DISABLE ALL TIMER INTERRUPTS
            STAA    T13CTR
            STAB    T2CTR
            STAB    T13CTR
            STAA    T13CTR
****------------------------------------------------------------------****
**** INITIALIZE NMI INTERRUPT ( 'E' KEY ACCESSES J-BUB RTNE )        ****
****------------------------------------------------------------------****
            LDX     X'E14E',I               'KEYDC'RTNE-SCAN & DECODE KEYBOARD
            STX     X'A006'                 STR 'KEYDC' AT RMB 'NIO'
            LDAA    X'FF',I                 INITIALIZE J-BUG (PIA)S
            STAA    SCNREG
            LDAA    X'7F',I
            STAA    DISREG
            JSR     X'E084'
            JSR     X'E0B2'                 'CLFLG'RNTE-CLR DPLY BFR & FLAGS
            LDAA    X'20',I                 SET SCAN REG PIA TO READ 'E' KEY
            STAA    SCNREG
            LDAA    SCNREG                  CLR IRQ FLAG
            LDAA    X'3D',I                 ENABLE IRQ
            STAA    SCNCTR
            CLI                             CLR CCR IRQ MASK
            RTS
****------------------------------------------------------------------****
****    MAIN ROUTINE                                                 ****
****------------------------------------------------------------------****
            ORG     X'FA10'
XYI         LDS     X'A078',I               LOAD STACK POINTER
            JSR     XYIINIT                 JMP TO SUB INITIAL
BEGIN       LDS     X'A078',I               RELOAD STACK POINTER
            CLR     HDOREG                  RAISE HEAD & CLOSE SHUTTER
            LDAA    MPUERR                  TST MPU ERROR STATUS RMB
            BEQ     START                   IF=0: NO ERRORS RECORDED
            JMP     START                   (NO ERR HDLG RTNE AT PRESENT)
START       LDAA    HDIREG                  READ MODE SELECT A & B
            ANDA    X'0C',I
            CMPA    X'04',I                 AUTO = 04
            BNE     RDSA
            JMP     AUTO
RDSA        LDAA    HDIREG                  READ MODE SELECT A & B
            ANDA    X'0C',I
            CMPA    X'08',I                 SEMI-AUTO = 08
            BNE     XYMAN
            LDAA    MINREG                  READ TBL-IN-PSN SIG
            BITA    X'80',I
            BEQ     RDSA                    WAIT FOR PSN SIG ON OR SEMIAUTO OFF
            LDAA    HDIREG                  READ RAISE HEAD SIG FROM S/1
            BITA    X'01',I
            BEQ     LHEAD
RHD         LDAA    HDOREG                  RAISE HEAD & CLOSE SHUTTER
            ANDA    X'3F',I
            STAA    HDOREG
            BRA     RDSA
```

```
LHEAD    LDAA  HDOREG              LOWER HEAD & OPEN SHUTTER
         ORAA  X'C0',I
         STAA  HDOREG
RRHD     LDAA  HDIREG              READ RAISE HEAD SIG FROM S/1
         BITA  X'01',I
         BNE   RHD
         LDAA  HDIREG              READ MODE SELECT A & B
         ANDA  X'0C',I
         CMPA  X'08',I             SEMI-AUTO = 08
         BEQ   RRHD                SEMI-AUTO MODE REQUISTED
         BRA   RHD                 SEMI-AUTO MODE NOT REQUISTED
XYMAN    LDAA  HDIREG
         BITA  X'80',I             READ HEAD UP/DOWN SW
         BEQ   SHUTSW
         LDAA  HDOREG
         EORA  X'80',I             REVERSE HEAD POSITION
         STAA  HDOREG
B1       LDAA  HDIREG
         BITA  X'80',I             HAS SWITCH BEEN RELEASED
         BNE   B1
SHUTSW   LDAA  HDIREG
         BITA  X'40',I             READ SHUTTER SW
         BEQ   TSTMM               IF OFF: GO TO TST TBL IN PSN SIG
         LDAA  HDOREG
         EORA  X'40',I             REVERSE SHUTTER POSITION
         STAA  HDOREG
         BITA  X'40',I             IS SHUTTER OPEN ?
         BEQ   B2                  IF NO: GO TO B2
         JSR   STRTTMR             IF YES: START TIMER (SHUTTER OPEN)
B2       LDAA  HDIREG
         BITA  X'40',I             IS SHUTTER SW RELEASED
         BNE   B2
TSTMM    LDAA  HDIREG              IS MANUAL MEASURE SW ON
         BITA  X'02',I
         BEQ   CHMAN               IF NO: GO TO CHECK MANUAL MODE
         JMP   AUTO                TAKE MEASUREMENTS,CAL POINT 'P'
         BRA   XYMAN
CHMAN    LDAA  HDIREG              READ MODE SELECT A .'EZB
         ANDA  X'0C',I
         CMPA  X'0C',I             MANUAL = 0C
         BEQ   XYMAN               LOOP IN MANUAL MODE ** ALTER **
         JMP   BEGIN
TMRFLAG  LDAA  T2CTR               IS TMR 2 FLAG SET ?
         BITA  X'02',I
         BEQ   XYMAN               IF NO: LOOP IN MANUAL MODE
         LDAA  HDOREG              RAISE HEAD & CLOSE SHUTTER
         ANDA  X'3F',I
         STAA  HDOREG
         NOP                       CLR TIMER 2 FLAG  ** ALTER **
         NOP
         NOP
         JMP   XYMAN               LOOP IN MANUAL MODE
AUTO     LDAA  MINREG
         BITA  X'80',I             TST: TABLE IN POSITION SIG
         BNE   CAUTO
         JMP   START
CAUTO    LDAA  HDOREG
         ORAA  X'C0',I             LOWER HEAD & OPEN SHUTTER
         STAA  HDOREG
         LDAA  X'EF',I
         ANDA  MOREG               SEND 6800 RDY TO RECEIVE
         STAA  MOREG
SRCRDY   LDAA  MINREG
         BITA  X'20',I             IS SRC DATA READY
```

```
              BNE      SRCRDY
              LDAA     SRCREG             READ SRC & HSC
              TAB
              ANDB     X'F0',I            REMOVE HSC AND STORE SRC AT SRCRMB
              STAB     SRCRMB
              ANDA     X'0F',I            REMOVE SRC AND STORE HSC AT HSCRMB
              JSR      CLRDAT             FIX CLR DATAREG
              LDAA     X'10',I            REMOVE 6800 RDY TO RECEIVE
              ORAA     MOREG
              STAA     MOREG
              LDAA     SRCRMB             RD. SRC
              CMPA     X'10',I            IS STD. MEASUREMENT REQ.
              BEQ      RDRDY              IF YES: CONT.TO RDRDY
              JMP      INVALST            IF NO: GO TO INVALID STATE
RDRDY         LDAA     MINREG             READ S/1 RDY TO RECEIVE
              BITA     X'40',I
              BNE      RDRDY
              LDAA     SRCRMB             LOAD SRC CODE
              STAA     MRCREG             SEND SRC TO S/1
              JSR      SENRDY
RDHEAD        LDAA     HDIREG
              BITA     X'20',I            IS HEAD DOWN
              BEQ      RDHEAD
              JSR      DELAY              DELAY: 255 MSEC
              CLR      STATRMB            CLR STATUS DATA RMBS
              CLR      STATRMB+1
              JSR      XYIMEAS            TAKE MEASUREMENTS
              CLR      XYSENT             CLEAR X&Y SENT RMB
SENDATA       LDAA     X'EF',I
              ANDA     MOREG              SEND 6800 RDY TO RECEIVE
              STAA     MOREG
SRCRDY2       LDAA     MINREG             IS SRC DATA READY
              BITA     X'20',I
              BNE      SRCRDY2
              LDAA     SRCREG             READ SRC CODE
              ANDA     X'F0',I            REMOVE HSC AND STORE AT SRCRMB
              STAA     SRCRMB
              LDAA     X'10',I            REMOVE 6800 RDY TO RECEIVE
              ORAA     MOREG
              STAA     MOREG
              LDAA     SRCRMB             IS S/1 REQUESTING STATUS
              CMPA     X'60',I
              BEQ      SENSTAT            BRANCH TO SEND STATUS
              LDAA     SRCRMB
              CMPA     X'20',I            WANT X DATA ?
              BNE      SENDY
SENDX         LDAA     ENDXP              LOAD HIGH ORDER X
              ORAA     X'F0',I            PREPARE TO COMBINE W/MRC
              STAA     MRCREG
              LDAA     ENDXP+1            LOAD LOW ORDER X
              STAA     DATAREG
              LDAA     X'2F',I            LOAD X AVE MRC CODE
              ANDA     MRCREG
              STAA     MRCREG
              JSR      SENRDY             SEND 6800 RDY TO SEND
              LDAA     XYSENT
              BITA     X'40',I            HAS Y DATA BEEN SENT
              BNE      ENDSEND            YES,JMP TO ENDSEN
              LDAA     X'80',I
              ORAA     XYSENT             SET FLAG FOR X SENT
              STAA     XYSENT
              JMP      SENDATA
SENDY         CMPA     X'30',I            WANT Y DATA?
              BNE      INVALST            NO, JMP TO INVALID STATUS
```

```
          LDAA   ENDYP              LOAD HIGH ORDER Y
          ORAA   X'F0',I            PREPARE FOR COMBINE W/MRC
          STAA   MRCREG
          LDAA   ENDYP+1            LOAD LOW ORDER Y
          STAA   DATAREG
          LDAA   X'3F',I            LOAD X AVE MRC CODE
          ANDA   MRCREG
          STAA   MRCREG
          JSR    SENRDY
          LDAA   XYSENT             HAS X BEEN SENT?
          BITA   X'80',I
          BNE    ENDSEND            YES, JMP TO ENDSEND
          LDAA   X'40',I
          ORAA   XYSENT             SET PSW YSENT
          STAA   XYSENT
          JMP    SENDATA
****------------------------------------------------------------****
**** INVALID STATEMENT                                           ****
****------------------------------------------------------------****
INVALST   LDAA   X'10',I            LOAD STATUS RMB
          STAA   STATRMB+1          WITH INVALID REQUEST
****------------------------------------------------------------****
**** SEND STATUS                                                 ****
****------------------------------------------------------------****
SENSTAT   LDAA   STATRMB+1
          STAA   DATAREG            LOAD LOW ORDER STATUS
          LDAA   STATRMB
          ORAA   X'F0',I            LOAD HIGH ORDER STATUS
          ANDA   X'6F',I            AND LOAD STATUS IN MRC
          STAA   MRCREG
          JSR    SENRDY
          TST    STATRMB            WAS THERE HIGH ORDER STATUS?
          BEQ    NEXTST             YES, JUMP TO ENDSEND
          JMP    ENDSEND
NEXTST    TST    STATRMB+1          WAS THERE LOW ORDER STATUS
          BNE    ENDSEND            YES, JUMP TO ENDSEND
          JMP    SENDATA
****------------------------------------------------------------****
**** END SEND RTNE                                               ****
****------------------------------------------------------------****
ENDSEND   LDAA   MINREG             READ TABLE IN POSITION
          BITA   X'80',I            IF NOT IN POS JMP TO START
          BNE    ENDSEND
          JMP    START
****------------------------------------------------------------****
**** SEND SIG TO S/1: 6800 DATA READY                            ****
****------------------------------------------------------------****
SENRDY    LDAA   MINREG             READ S/1 RDY TO RECEIVE
          BITA   X'40',I
          BNE    SENRDY
          LDAA   X'DF',I            OUTPUT  MRC DATA READY (0)
          ANDA   MOREG
          STAA   MOREG
RDREQ     LDAA   MINREG             IS S/1 READY TO RECEIVE GONE(0)
          BITA   X'40',I
          BEQ    RDREQ
          LDAA   X'20',I            REMOVE  MRC DATA RDY (1)
          ORAA   MOREG
          STAA   MOREG
          RTS
****------------------------------------------------------------****
**** DELAY RTNE                                                  ****
****------------------------------------------------------------****
DELAY     LDAA   X'FF',I            255 MSEC DELAY
          STAA   DLYBFR
```

```
              JSR     MSDELAY              MSEC DELAY RTNE
              RTS
****----------------------------------------------------------------****
**** CLR DATAREG FIX RTNE                                           ****
****----------------------------------------------------------------****
CLRDAT        STAA    HSCRMB
              CLR     DATAREG
              RTS
STRTTMR       RTS                                  ** ALTER **
****----------------------------------------------------------------****
**** MEASURE RTNE                                                   ****
****----------------------------------------------------------------****
XYIMEAS       JSR     RDHSC                READ HOLE SIZE CODE, SET POINTER
LOAD          JSR     LOADCST              OUTPUT C.P. & V.L.S. CONSTANTS
              LDAA    PSW1                 CLEAR PSW 'YAXIS'
              ANDA    X'BF',I
              STAA    PSW1
AXIS          JSR     RDAXIS               TST & RD SELECTED AXIS
              JSR     CALP                 CALCULATE & STR PNT 'P' FOR EACH RGD
              JSR     IPNTR                INITIALIZE POINTERS FOR CALCULATIONS
              JSR     CALAVEP              CALCULATE AVERAGE PNT 'P'
              LDAA    PSW1                 READ PSW 'YAXIS'
              BITA    X'40',I              IS PSW 'YAXIS' SET?
              BNE     YDONE                IF YES: BOTH AXES DONE
              LDAA    PSW1                 IF NO: SET PSW 'YAXIS'
              ORAA    X'40',I
              STAA    PSW1
              BRA     AXIS                 START PROCESSING Y AXIS
YDONE         JSR     CENDIST              TST CENTER DISTRIBUTION ERROR
              LDAA    HDIREG               IS AUTO MODE REQUIRED?
              ANDA    X'0C',I
              CMPA    X'04',I
              BNE     DPLY                 IF NO: GO TO DPLY
              LDAA    X'34',I              CLR COUNT DOWN SIG FOR X&Y DPLY
              STAA    X4ACTR
              STAA    Y4ACTR
              RTS                          IF YES: DO NOT DISPLAY
*-------------------------------------------------------------------*
* USE THE FOLLOWING STEPS FOR DISPLAYING SINGLE AVERAGE 'P' ONLY
*-------------------------------------------------------------------*
DPLY          LDAA    ENDXP                DPLY X 'P' AVE. (MSB)
              STAA    X4BREG
              LDAA    ENDXP+1              DPLY X 'P' AVE. (LSB)
              STAA    X4AREG
              LDAA    X'3C',I
              STAA    X4ACTR               SEND COUNT DOWN SIG FOR X DPLY
              LDAA    ENDYP                DPLY Y 'P' AVE. (MSB)
              STAA    Y4BREG
              LDAA    ENDYP+1              DPLY Y 'P' AVE. (LSB)
              STAA    Y4AREG
              LDAA    X'3C',I
              STAA    Y4ACTR               SEND COUNT DOWN SIG FOR Y DPLY
              JSR     HORZ                 CALCULATE Y HORIZONTAL
              RTS
*-------------------------------------------------------------------*
* LOAD HOLE CONSTANTS COMPARE PRESET & V L SELECTED                 *
*-------------------------------------------------------------------*
LOADCST       LDX     HSCPNTR              LOAD XREG W/ HSC POINTER
              LDX     00,X                 LOAD PRESET VALUE INTO XREG
              STX     PRESET               RECORD PRESETV VALUES
              LDAA    X'04',I              SET SHIFT CNTR = 4 SHIFTS
SHIFT         CLC                          CLR CCR CARRY BIT
              LSR     PRESET               SHIFT PRESET VALUE 4 BIT TO RT
              ROR     PRESET+1
```

```
              DECA                    DECREMENT SHIFT CNTR
              BNE     SHIFT
              LDAA    PRESET+1        ADD 9 TO PRESET COMPARE CST FOR
              ADDA    09,I            'B' CNTR TEST
              STAA    PRESET+1
              NEG     PRESET+1        2S COMPLIMENT PRESET VALUE
              BCS     CP
              NEG     PRESET
              BRA     ESP
CP            COM     PRESET
ESP           LDX     HSCPNTR
              LDAA    00,X            LOAD COMPARE PRESET MSB
              STAA    X2AREG          X AXIS
              STAA    Y2AREG          Y AXIS
              LDAA    01,X            LOAD COMPARE PRESET LSB
              STAA    X1BREG          X AXIS
              STAA    Y1BREG          Y AXIS
              LDAA    02,X            LOAD V L SELECTED DATA
              STAA    X3BREG          X AXIS
              STAA    Y3BREG          Y AXIS
              LDAA    03,X            LOAD START FRAME DATA
              STAA    SFREG           FOR BOTH AXIS
              LDAA    04,X            LOAD END FRAME DATA
              STAA    EFREG           FOR BOTH AXIS
              LDAA    05,X            LOAD LEFT SIDE MARGIN DATA
              STAA    LMREG           FOR BOTH AXIS
              LDAA    06,X            LOAD LEFT & RIGHT SIDE MARGIN DATA
              STAA    LRMREG          FOR BOTH AXIS
              LDAA    07,X            LOAD RIGHT SIDE MARGIN DATA
              STAA    RMREG           FOR BOTH AXIS
              RTS
*-----------------------------------------------------------------*
* DETERMIN AXIS, READ CNTRS,ESTABLISH POINTERS                 ****
*-----------------------------------------------------------------*
RDAXIS        LDAA    PSW1            READ PSW Y AXIS (BIT 6)
              BITA    X'40',I         IS PSW YAXIS SET?
              BNE     Y               IF YES: GO TO 'Y'
              JSR     IXPNTR          INITIALIZE X AXIS POINTER
              JSR     READX           IF NO: RD & STR 'A'&'B' X READINGS
              JSR     IXPNTR          REINITIALIZE X AXIS POINTER
ENDAXIS       RTS
Y             JSR     IYPNTR          INITIALIZE Y AXIS POINTER
              JSR     READY           RD & STR 'A'&'B' Y READINGS
              JSR     IYPNTR          REINITIALIZE Y AXIS POINTER
              RTS
****-------------------------------------------------------------****
* INITIALIZE X OR Y POINTER                                      ****
****-------------------------------------------------------------****
IPNTR         LDAA    PSW1            READ PSW YAXIS
              BITA    X'40',I
              BNE     DOY
              JSR     IXPNTR          INIT. X AXIS PNTR
              RTS
DOY           LDAA    HDIREG          READ MODES
              ANDA    X'0C',I
              CMPA    X'04',I         IS AUTO MODE REQUIRED?
              BEQ     RHCS            IF YES: GO TO 'RHCS'
              CMPA    X'08',I         IS SINGLE CYCLE REQUIRED?
              BEQ     ENDI            IF YES: GO TO 'ENDI'
              CMPA    X'0C',I         IS MANUAL MODE REQUIRED?
              BEQ     ENDI            IF YES: GO TO 'ENDI'
              BRA     MODEERR         IF NO: GO TO 'MODEERR'
RHCS          CLR     HDOREG          RAISE HEAD & CLOSE SHUTTER
ENDI          JSR     IYPNTR          INIT. Y AXIS PNTR
```

```
            CLR     MPUERR              CLR MPU ERROR STATUS RMB
            RTS
****------------------------------------------------------------****
**** ERROR **** MODE UNDEFINED                                  ****
****------------------------------------------------------------****
MODEERR     LDAA    X'01',I             SET MPUERR = MODE UNDEFINED
            STAA    MPUERR
            JMP     BEGIN
*---------------------------------------------------------------*
* INITIALIZE Y AXIS POINTERS FOR CALCULATIONS                   *
*---------------------------------------------------------------*
IYPNTR      LDX     CNTRYA,I            SET POINTER = 1ST CNTR 'A' RECORDING
            STX     SAVEA               SAVE CNTR 'A' POINTER
            LDX     CNTRYB,I            SET POINTER = 1ST CNTR 'B' RECORDING
            STX     SAVEB               SAVE CNTR 'B' POINTER
            LDX     PNTY,I              SET POINTER = 1ST POINT 'P' LOCATION
            STX     SAVEP               SAVE POINTER 'P' LOCATION
            LDX     ENDYP,I             SET POINTER = LAST 'P' LOCATION+1
            STX     CNTEND              SAVE LAST P+1 LOCATION
            RTS
*---------------------------------------------------------------*
* INITIALIZE X AXIS POINTERS FOR CALCULATIONS                   *
*---------------------------------------------------------------*
IXPNTR      LDX     CNTRXA,I            SET POINTER = 1ST CNTR 'A' RECORDING
            STX     SAVEA               SAVE CNTR 'A' POINTER
            LDX     CNTRXB,I            SET POINTER = 1ST CNTR 'B' RECORDING
            STX     SAVEB               SAVE CNTR 'B' POINTER
            LDX     PNTX,I              SET POINTER = 1ST POINT 'P' LOCATION
            STX     SAVEP               SAVE POINTER 'P' LOCATION
            LDX     ENDXP,I             SET POINTER = LAST 'P' LOCATION+1
            STX     CNTEND              SAVE LAST P+1 LOCATION
            RTS
****------------------------------------------------------------****
**** CALCULATE POINT 'P' = CNTR 'A' + (CNTR 'B' / 2)            ****
****------------------------------------------------------------****
****------------------------------------------------------------****
**** DIVIDE CNTR 'B' IN HALF:                                   ****
****------------------------------------------------------------****
CALP        LDX     SAVEB               SET POINTER = CNTR 'B' RECORDING
            LDAB    00,X                CNTR 'B' MSB = ACC B
            LDAA    01,X                CNTR 'B' LSB = ACC A
            LSRB                        DIVIDE BY 2
            RORA
            BCC     CONTCAL             CONTINUE CALCULATION IF CARRY = 0
            ADDA    X'01',I             ROUND UP LSB IF CARRY = 1
            BCC     CONTCAL             CONTINUE CALCULATION IF CARRY = 0
            ADDB    X'01',I             INCREMENT MSB IF CARRY = 1
            BCC     CONTCAL             CONTINUE CALCULATION IF CARRY = 0
****------------------------------------------------------------****
**** ERROR **** 'B' READING DIVIDED BY 2 IS OVERSIZE            ****
****------------------------------------------------------------****
            LDAA    X'04',I             SET MPUERR = 'B'/2 IS OVERSIZE
            STAA    MPUERR
            JMP     BEGIN
****------------------------------------------------------------****
**** ADD HALF OF COUNTER 'B' TO COUNTER 'A':                    ****
****------------------------------------------------------------****
CONTCAL     CLR     MPUERR              CLR MPU ERROR STATUS RMB
            INX                         ADVANCE POINTER TO NEXT CNTRXB RDG
            INX
            STX     SAVEB
            LDX     SAVEA               SET POINTER = CNTR 'A' RECORDING
            ADDA    01,X                ADD LSB'S 'A' & 'B'/2
            ADCB    00,X                ADD MSB'S 'A' & 'B'/2 & CARRY BIT
```

```
              BCC    CONTADD                GO TO ERROR1 IF CARRY = 1
****---------------------------------------------------------------****
**** ERROR **** 'A'+'B'/2 ADDITION IS OVERSIZE:                   ****
****---------------------------------------------------------------****
              LDAA   X'05',I                SET MPUERR = 'A'+'B'/2 OVERSIZE
              STAA   MPUERR
              JMP    BEGIN
*------------------------------------------------------------------*
CONTADD       CLR    MPUERR                 CLR MPU ERROR STATUS RMB
              INX                           ADVANCE POINTER TO NEXT CNTRXA U2G
              INX
              STX    SAVEA
* RECORD POINT 'P'
              LDX    SAVEP                  SET POINTER = POINT 'P' LOCATION
              STAB   00,X                   RECORD POINT 'P' MSB
              STAA   01,X                   RECORD POINT 'P' LSB
              INX                           ADV POINTER TO NEXT 'P' LOCATION
              INX
              STX    SAVEP
              CPX    CNTEND                 TEST END OF OPERATION
              BNE    CALP                   CALCULATE NEXT POINT 'P' IF NOT = 0
              RTS                           ALL POINT 'P' CALCULATIONS DONE
*------------------------------------------------------------------*
* CALCULATE POINT 'P' AVERAGE                                      *
*------------------------------------------------------------------*
* ADD ALL POINT 'P' READINGS:
CALAVEP       LDX    SAVEP                  SET POINTER = 1ST 'P' LOCATION
              LDAB   00,X                   'P' MSB = ACC B
              LDAA   01,X                   'P' LSB = ACC A
ADVPNTR       INX                           ADVANCE POINTER TO NEXT 'P' LOCATION
              INX
              CPX    CNTEND                 TEST FOR LAST 'P' LOCATION
              BEQ    DIVP                   IF R=0 ADDITION IS COMPLETE
              ADDA   01,X                   ADD LSB'S
              ADCB   00,X                   ADD MSB'S WITH CARRY BIT
              BCC    ADVPNTR                IF C=0 REPEAT FROM ADVANCE POINTER
****---------------------------------------------------------------****
**** ERROR **** ADDITION OF 'P' IS OVERSIZE:                      ****
****---------------------------------------------------------------****
              LDAA   X'03',I                SET MPUERR = 'P' ADDITION OVERSIZE
              STAA   MPUERR
              JMP    BEGIN
****---------------------------------------------------------------****
**** DIVIDE POINT 'P' TOTAL BY 16:                                ****
****---------------------------------------------------------------****
DIVP          CLR    MPUERR                 CLR MPU ERROR STATUS RMB
              STAB   00,X                   SAVE 'P' TOTAL MSB AT PNTR LOC
              STAA   01,X                   SAVE 'P' TOTAL LSB AT PNTR+1 LOC
              LDAB   PSW1                   CLEAR PSW 8PLUS
              ANDB   X'7F',I
              STAB   PSW1
              ANDA   X'0F',I                TEST UNIT BITS OF 'P' FOR > 8
              CMPA   X'08',I
              BLS    CONTDIVP               P=OR<8, CONTINUE DIVIDE OPERATION
              LDAA   PSW1                   P>8, SET PSW 8PLUS
              ORAA   X'80',I
              STAA   PSW1
CONTDIVP      LDAA   X'04',I                LOAD SOFTWARE COUNTER
              STAA   SWCNTR
DA            LSR    00,X                   DIVIDE 'P' BY LOGIC SHIFT RIGHT MSB
              ROR    01,X                   AND ROTATE RIGHT LSB 4 TIMES
              DEC    SWCNTR
              BNE    DA
              TST    PSW1                   TEST PSW 8PLUS
```

```
              BPL    ENDDIVP              AVE.'P'OPER.DONE (NO ROUNDING REQ.)
              LDAA   01,X                 ROUND UP 'P' LSB
              ADDA   X'01',I
              STAA   01,X
              BCC    ENDDIVP
              LDAA   00,X                 ADD 1 TO 'P' MSB
              ADDA   X'01',I
              STAA   00,X
              BCS    ERRP
ENDDIVP       RTS                         'P'AVERAGE OPERATION COMPLETE !!!!!
****------------------------------------------------------------------****
**** ERROR **** 'P' AVERAGE IS OVERSIZE                              ****
****------------------------------------------------------------------****
ERRP          LDAA   X'02',I              SET MPUERR = 'P' AVERAGE OVERSIZE
              STAA   MPUERR
              JMP    BEGIN
****------------------------------------------------------------------****
**** READ HOLE SIZE CODE (HSC), IDENTIFY & SET HOLE SIZE POINTER      ****
****------------------------------------------------------------------****
RDHSC         LDAA   HSCRMB               READ HOLE SIZE CODE: IS HSC = 00 ?
              BEQ    HSCIV                IF YES, GO TO HSC INVALID
              CMPA   X'07',I              IS HSC > 07 ?
              BHI    HSCIV                IF YES, GO TO HSC INVALID
              LDX    H0,I                 SET HSCPNTR = FIRST HSC CST ADDR
              STX    HSCPNTR
              LDAB   X'07',I              ADJUST HSC POINTER ( 8 TIMES HSC )
AHSC          ADDA   HSCRMB               AREG = HSC + AREG
              DECB                        IS ADD COUNTER = 0 ?
              BNE    AHSC                 IF NO: LOOP BACK AND ADD A HSC
              STAA   HSCPNTR+1            ELSE: RECORD RESULT AT HSCPNTR+1
              RTS                         HSCPNTR IS NOW UPDATED !!!!!!!
HSCIV         LDX    X'0040',I            LOAD STATRMB W/'INVALID HOLE SIZE'
              JMP    HDLSTAT              HANDLE STATUS ERROR RTNE
****------------------------------------------------------------------****
**** READ AND STORE X AXES COUNTER A & COUNTER B                     ****
****------------------------------------------------------------------****
READX         LDX    SAVEA                INITIALIZE INDEX REGISTER
              CLR    SFCNTR               SET START FRAME COUNTER = 01
              INC    SFCNTR
XCSFF         LDAA   X1BREG               CLEAR START FRAME IRQ FLAG
XSF           LDAA   X1BCTR               WAIT FOR START FRAME IRQ
              BPL    XSF
              LDAA   X2AREG               CLEAR END FRAME IRQ FLAG
              LDAA   X1AREG               CLEAR B COUNTER IRQ FLAG
XVLSS         LDAA   X'34',I              SEND V L SELECTED VALID SIGNAL
              STAA   X3ACTR               ON CA2 LINE H TO L TO H
              LDAA   X'3C',I
              STAA   X3ACTR
              LDAA   X3AREG               CLEAR LINE SELECTED IRQ FLAG
XVLS          LDAA   X3ACTR               WAIT FOR LINE SELECTED IRQ FLAG
              BPL    XVLS
              CLRB                        CLEAR TIME-OUT COUNTER
XTMR          INCB                        INCREMENT TIME-OUT COUNT
              CMPB   X'0E',I              TEST 114 MICROSEC TIME-OUT
              BNE    XTMR
              LDAA   X1ACTR               TEST B COUNTER IRQ FLAG SET
              BMI    XEF
              LDAA   X2ACTR               TEST END FRAME IRQ FLAG
              BMI    XIFC
              BRA    XVLSS                TIME-OUT, REPEAT SEND V L VALID
XEF           LDAA   X2ACTR               TEST END FRAME IRQ FLAG
              BPL    XRC
XIFC          INC    SFCNTR               INCREMENT START FRAME COUNTER
              JSR    TSTSFC               TST START FRAME COUNTER
              BRA    XCSFF                REPEAT 1ST CLEAR START FRAME IRQ
```

```
XRC     LDAA    X1BREG          RD & STR COUNTER B MSB
        ANDA    X'0F',I
        STAA    X'50',X         RECORD CNTR 'B' MSB
        LDAA    X3AREG          RD & STR COUNTER A MSB
        ANDA    X'0F',I
        STAA    00,X            RECORD CNTR 'A' MSB
        INX
        LDAA    X1AREG          RD & STR COUNTER B LSB
        STAA    X'50',X         RECORD CNTR 'B' LSB
        JSR     TSTB            TST B CNTR W/ PRESET
        LDAA    X2BREG          RD & STR COUNTER A LSB
        STAA    00,X            RECORD CNTR 'A' LSB
        JSR     TSTLSB          TEST FOR FF IN LSB
        INX
        CPX     ENDXA,I         TST LAST READING
        BNE     XVLSS           LOOP BACK FOR NEXT READING
        RTS
*---------------------------------------------------------------------*
* READ AND STORE Y AXES COUNTER A & COUNTER B                      ****
*---------------------------------------------------------------------*
READY   LDX     SAVEA           INITIALIZE INDEX REGISTER
        CLR     SFCNTR          SET START FRAME COUNTER = 01
        INC     SFCNTR
YCSFF   LDAA    Y1BREG          CLEAR START FRAME IRQ FLAG
YSF     LDAA    Y1BCTR          WAIT FOR START FRAME IRQ
        BPL     YSF
        LDAA    Y2AREG          CLEAR END FRAME IRQ FLAG
        LDAA    Y1AREG          CLEAR B COUNTER IRQ FLAG
YVLSS   LDAA    X'34',I         SEND V L SELECTED VALID SIGNAL
        STAA    Y3ACTR          ON CA2 LINE H TO L TO H
        LDAA    X'3C',I
        STAA    Y3ACTR
        LDAA    Y3AREG          CLEAR LINE SELECTED IRQ FLAG
YVLS    LDAA    Y3ACTR          WAIT FOR LINE SELECTED IRQ FLAG
        BPL     YVLS
        CLRB                    CLEAR TIME-OUT COUNTER
YTMR    INCB                    INCREMENT TIME-OUT COUNT
        CMPB    X'0E',I         TEST 114 MICROSEC TIME-OUT
        BNE     YTMR            REPEAT WAIT FOR READ COUNTER IRQ
        LDAA    Y1ACTR          TEST B COUNTER IRQ FLAG SET
        BMI     YEF
        LDAA    Y2ACTR          TEST END FRAME IRQ FLAG
        BMI     YIFC
        BRA     YVLSS           TIME-OUT, REPEAT SEND V L VALID
YEF     LDAA    Y2ACTR          TEST END FRAME IRQ FLAG
        BPL     YRC
YIFC    INC     SFCNTR          INCREMENT START FRAME COUNTER
        JSR     TSTSFC          TST START FRAME COUNTER
        BRA     YCSFF           REPEAT 1ST CLEAR START FRAME IRQ
YRC     LDAA    Y1BREG          RD & STR COUNTER B MSB
        ANDA    X'0F',I
        STAA    X'50',X         RECORD CNTR 'B' MSB
        LDAA    Y3AREG          RD & STR COUNTER A MSB
        ANDA    X'0F',I
        STAA    00,X            RECORD CNTR 'A' MSB
        INX
        LDAA    Y1AREG          RD & STR COUNTER B LSB
        STAA    X'50',X         RECORD CNTR 'B' LSB
        JSR     TSTB            TST B CNTR W/ PRESET
        LDAA    Y2BREG          RD & STR COUNTER A LSB
        STAA    00,X            RECORD CNTR 'A' LSB
        JSR     TSTLSB          TEST FOR FF IN LSB
        INX
        CPX     ENDYA,I         TST FOR LAST CNTR Y READING
        BNE     YVLSS
```

```
                RTS
****--------------------------------------------------------------------****
**** TEST B COUNTER WITH COMPARE PRESET VALUE:                          ****
****--------------------------------------------------------------------****
TSTB    LDAB    X'4F',X             LD ACCB W/ B(MSB),ACCA = B(LSB)
        ADDA    PRESET+1            SUB W/2S COMPLIMENT ADDITION (LSB)S
        ADCB    PRESET              SUB W/2S COMPLIMENT ADDITION (MSB)S
        BCS     BOK                 IF C=1.'EZB    CNTR =OR> PRESET: B IS OK
RDERR   DEX                         IF C=0:MOVE PNTR BACK & REREAD CNTRS
        PULA                        ADJUST STACK POINTER FOR LAST JSR
        PULA
        LDAA    PSW1                READ PSW 'YAXIS'
        BITA    X'40',I
        BNE     JY                  IF PSW 'YAXIS' IS SET: REREAD Y CNTR
        JMP     XVLSS               REREAD X CNTRS
JY      JMP     YVLSS               REREAD Y CNTRS
BOK     RTS
****--------------------------------------------------------------------****
**** TEST NUMBER OF START FRAMES COUNTED:                               ****
****--------------------------------------------------------------------****
TSTSFC  LDAA    SFCNTR              READ NUMBER OF START FRAMES USED
        CMPA    X'04',I
        BEQ     SFERR
        RTS
SFERR   LDX     X'0100',I           MAKE STATUS 'TOO MANY START FRAMES'
HDLSTAT STX     STATRMB
        LDS     X'A078',I           RESET STACK POINTER
        LDAA    HDOREG              RAISE HEAD & CLOSE SHUTTER
        ANDA    X'3F',I
        STAA    HDOREG
        JMP     SENDATA
*********************************************************************
****    SUB-ROUTINES                                                 ****
*********************************************************************
****--------------------------------------------------------------------****
****    TIME DELAY RTNE FOR 1 MSEC                                     ****
****--------------------------------------------------------------------****
MSDELAY LDAB    161,I
AN      DECB
        BNE     AN
        DEC     DLYBFR
        BNE     MSDELAY
        NOP
        RTS
****--------------------------------------------------------------------****
**** CENTER DISTRIBUTION ERROR RTNE                                    ****
****--------------------------------------------------------------------****
* PR = PA - PN : ERROR :IF 4 OF THE 16 (PR)S ARE GREATER THAN + OR - 15
* PR = POINT 'P' RESULT
* PA = POINT 'P' AVERAGE
* PN = ONE OF THE 16 POINT 'P' RECORDINGS
****--------------------------------------------------------------------****
CENDIST LDAA    PSW1                CLR PSW 'YAXIS'
        ANDA    X'BF',I
        STAA    PSW1
        CLR     CDECNT              CLR CENT. DIST. ERR COUNTER
NEXTAXIS CLR    DELTACD             CLR CENT. DIST. DELTA
        CLR     DELTACD+1
        JSR     IPNTR               INITIALIZE POINTER
NEXTPN  LDX     SAVEP               SET POINTER = PN ADDR
        LDAA    00,X                ACC A = PN MSB
        LDAB    01,X                ACC B = PN LSB
        NEGB                        2S COMPLIMENT PN LSB
        BCS     COM                 IF C=1: COMPLIMENT PN MSB
        NEGA                        IF C=0: 2S COMPLIMENT PN MSB
```

```
              BRA     CONTST
COM           COMA                    COMPLIMENT PN MSB
CONTST        INX                     INCREMENT PNTR = NEXT PN ADDR
              INX
              STX     SAVEP           SAVE PNTR OF NEXT PN ADDR
              LDX     CNTEND          SET PNTR = PA = LAST PN ADDR+1
              ADDB    01,X            PN LSB + PA LSB
              ADCA    00,X            PN MSB + PA MSB + CARRY
              BCC     TPNE            IF C=0: RESULT - & NEGATATED
REALNO        ADDB    DELTACD+1       SUM  CENT. DIST. DELTAS LSB
              ADCA    DELTACD         SUM  CENT. DIST. DELTAS MSB
              STAA    DELTACD         RECORD TOTAL SUM MSB
              STAB    DELTACD+1       RECORD TOTAL SUM LSB
              BCS     TCDC            IF C=1: TOTAL SUM IS TO LARGE
TPNE          CPX     SAVEP           TST FOR LAST PN TEST
              BNE     NEXTPN
TCDE          LDAB    HSCRMB          IS HOLE SIZE > OR = 3
              CMPB    X'03',I
              BHI     HIGH
              LDAB    DELTACD+1
              CMPB    X'2B',I         TEST CENT. DIST. ERROR
              BHI     CDERR           GO TO CENTER DISTRIBUTION ERROR
              BRA     TYAXIS          ELSE: GO TO TEST Y AXIS
HIGH          LDAB    DELTACD+1
              CMPB    X'6B',I         TEST CENT. DIST. ERROR
              BHI     CDERR           GO TO CENTER DISTRIBUTION ERROR
TYAXIS        LDAA    PSW1            READ PSW 'YAXIS'
              BITA    X'40',I
              BEQ     CONTCD          CONTINUE CENT. DIST. ERR. FOR Y
              RTS                     ERROR TEST FINISHED
CONTCD        LDAA    PSW1
              ORAA    X'40',I         SET PSW 'YAXIS'
              STAA    PSW1
              JMP     NEXTAXIS
TCDC          LDAA    CDECNT          TEST CENT. DIST. ERROR COUNT
              BNE     CDERR           TWO ERRORS RECORDED, GOTO CDERR
              INC     CDECNT          ONE ERROR IS RECORDED
              JMP     NEXTAXIS
CDERR         LDX     X'0200',I       SET STATUS= CENTER DISTRIBUTION ERR
              JMP     HDLSTAT         GO TO HANDLE STATUS RTNE
****-------------------------------------------------------------------****
****    TEST FOR FF IN LSB                                              ****
****-------------------------------------------------------------------****
TSTLSB        CMPA    X'FF',I
              BNE     AOK
              JMP     RDERR
AOK           LDAA    X'50',X
              CMPA    X'FF',I
              BNE     BOK1
              JMP     RDERR
BOK1          RTS
****-------------------------------------------------------------------****
****  Y AXIS HORZONTAL DISPLAY ( NOT WITTEN YET )                       ****
****-------------------------------------------------------------------****
HORZ          RTS
****-------------------------------------------------------------------****
****-------------------------------------------------------------------****
****    MPU VECTER ADDRESSES                                            ****
****-------------------------------------------------------------------****
              ORG     X'FFF8'
IRQ           DC      X'FA10'
SWI           DC      X'E032'
NMI           DC      X'E019'
RESTRT        DC      X'FA10'
              END
```

We claim:

1. Apparatus for determining the location of a hole in a circuit panel comprising:
imaging means for generating a plurality of scan signals having magnitudes representative of features of the hole in the circuit panel;
means for generating pulses at a fixed frequency;
first accumulator means for accumulating said pulses during a first portion of each of the scan signals representative of a distance from a reference position to a boundary point of the hole;
second accumulator means for accumulating said pulses during a second portion of each of the scan signals representative of a distance across the hole;
means responsive to the magnitudes of the scan signals for gating said pulses to the appropriate one of the first or second accumulator means;
means for comparing each value accumulated by the second accumulator means to a preset minimum value and for discarding values accumulated by the first and the second accumulator means if the value accumulated by the second accumulator means is less than the preset minimum value; and
processor means for first selecting certain values accumulated by the first and the second accumulator means based on the expected size of the hole, to provide a representative sample of the features in the approximate center of the hole represented by the magnitudes of the scan signals, and for then processing only said selected values to determine the location of the hole in the circuit panel.

2. Apparatus as recited in claim 1 wherein said imaging means comprises:
a first video camera means associated with a pulse generating means, first and second accumulator means, gating means, comparing means, and processor means, as recited in claim 14, for scanning along a first set of parallel scan lines and for generating a first set of scan signals having magnitudes representative of features of the hole in the circuit panel; and
a second video camera means also associated with a pulse generating means, first and second accumulator means, gating means, comparing means, and processor means, as recited in claim 14, for simultaneously scanning along a second set of parallel scan lines which are substantially orthogonal to the first set of parallel scan lines scanned by the first video camera means, and for generating a second set of signals which also have magnitudes representative of features of the hole in the circuit panel.

3. Apparatus as recited in claim 1 wherein said hole is substantially circular, and wherein said processor means comprises:
means for adding the value in the first accumulator means to half the value in the second accumulator means for each of the selected values accumulated by the first and the second accumulator means, and for averaging said resulting values.

4. Apparatus as recited in claim 1 further comprising:
support means for movably supporting said circuit panel in relation to the imaging means.

5. Apparatus as recited in claim 4 wherein said support means comprises:
means for orientating said circuit panel relative to a home position of said support means.

6. Apparatus as recited in claim 5 further comprising:
means for determining the location of the imaging means relative to the home position of the support means.

* * * * *